(12) United States Patent (10) Patent No.: US 7,634,352 B2
Soulchin et al. (45) Date of Patent: Dec. 15, 2009

(54) METHOD OF DISPLAYING TRAFFIC FLOW CONDITIONS USING A 3D SYSTEM

(75) Inventors: Robert M. Soulchin, King of Prussia, PA (US); Chris Braddock, Audubon, NJ (US); Jonathan K. Agree, Newtown, PA (US)

(73) Assignee: Navteq North America, LLC, Chicago, IL (US)

( * ) Notice: Subject to any disclaimer, the term of this patent is extended or adjusted under 35 U.S.C. 154(b) by 659 days.

(21) Appl. No.: 10/932,735

(22) Filed: Sep. 2, 2004
(Under 37 CFR 1.47)

(65) Prior Publication Data

US 2005/0143902 A1 Jun. 30, 2005

Related U.S. Application Data

(60) Provisional application No. 60/500,857, filed on Sep. 5, 2003.

(51) Int. Cl.
*G08G 1/00* (2006.01)
*G06F 19/00* (2006.01)

(52) U.S. Cl. .................. 701/117; 701/119; 701/208; 701/210; 701/211; 340/933; 340/934

(58) Field of Classification Search ......... 701/117–119, 701/200, 207–213; 345/440, 419; 340/995.14, 340/995.24–995.27, 933, 934; 349/995.13
See application file for complete search history.

(56) References Cited

U.S. PATENT DOCUMENTS

| 5,402,117 A | 3/1995 | Zijderhand |
| 5,539,645 A | 7/1996 | Mandhyan et al. |
| 5,583,494 A * | 12/1996 | Mizutani et al. ....... 340/995.14 |
| 5,594,432 A | 1/1997 | Oliva et al. |
| 5,673,039 A | 9/1997 | Pietzsch et al. |
| 5,774,827 A | 6/1998 | Smith, Jr. et al. |
| 5,812,069 A | 9/1998 | Albrecht et al. |
| 5,845,227 A | 12/1998 | Peterson |

(Continued)

FOREIGN PATENT DOCUMENTS

JP 11014382 A * 1/1999

(Continued)

OTHER PUBLICATIONS

Google Maps—Maps, Satellites, Hybrid versions; from Internet site http://www.google.com, 4 pages.*

(Continued)

*Primary Examiner*—Cuong H Nguyen
(74) *Attorney, Agent, or Firm*—Lisa M. Schoedel; Frank J. Kozak; Jon D. Shutter

(57) ABSTRACT

A computer-implemented method of displaying traffic conditions on a road system includes creating a 3D graphical map of the road system that includes one or more segments. The status of at least one of the segments on the 3D graphical map is determined. The status of the segment corresponds to traffic data associated with that segment. A 3D model of the road system is created by combining the 3D graphical map and the status of that segment.

50 Claims, 26 Drawing Sheets
(18 of 26 Drawing Sheet(s) Filed in Color)

U.S. PATENT DOCUMENTS

| | | | |
|---|---|---|---|
| 5,850,352 A * | 12/1998 | Moezzi et al. | 345/419 |
| 5,889,477 A | 3/1999 | Fastenrath | |
| 5,926,113 A | 7/1999 | Jones et al. | |
| 5,959,577 A | 9/1999 | Fan et al. | |
| 5,982,298 A | 11/1999 | Lappenbusch et al. | |
| 5,987,374 A | 11/1999 | Akutsu et al. | |
| 5,987,377 A | 11/1999 | Westerlage et al. | |
| 6,107,940 A | 8/2000 | Grimm | |
| 6,150,961 A | 11/2000 | Alewine et al. | |
| 6,151,550 A | 11/2000 | Nakatani | |
| 6,161,092 A | 12/2000 | Latshaw et al. | |
| 6,209,026 B1 * | 3/2001 | Ran et al. | 709/218 |
| 6,295,066 B1 * | 9/2001 | Tanizaki et al. | 345/419 |
| 6,401,027 B1 | 6/2002 | Xu et al. | |
| 6,452,544 B1 * | 9/2002 | Hakala et al. | 342/357.13 |
| 6,594,576 B2 | 7/2003 | Fan et al. | |
| 6,728,628 B2 | 4/2004 | Peterson | |
| 6,785,606 B2 | 8/2004 | DeKock et al. | |
| 6,845,316 B2 | 1/2005 | Yates | |
| 6,862,524 B1 | 3/2005 | Nagda et al. | |
| 6,911,918 B2 | 6/2005 | Chen | |
| 6,989,765 B2 | 1/2006 | Gueziec | |
| 7,010,424 B2 | 3/2006 | Zhao et al. | |
| 7,116,326 B2 * | 10/2006 | Soulchin et al. | 345/440 |
| 7,161,497 B2 | 1/2007 | Gueziec | |
| 7,221,287 B2 * | 5/2007 | Gueziec et al. | 340/905 |
| 7,274,311 B1 * | 9/2007 | MacLeod | 340/995.13 |
| 2002/0158922 A1 | 10/2002 | Clark et al. | |
| 2003/0171870 A1 * | 9/2003 | Gueziec | 701/202 |
| 2004/0083037 A1 | 4/2004 | Yamane et al. | |
| 2004/0243533 A1 * | 12/2004 | Dempster et al. | 707/1 |
| 2005/0033506 A1 | 2/2005 | Peterson | |
| 2005/0052462 A1 | 3/2005 | Sakamoto et al. | |
| 2005/0099321 A1 | 5/2005 | Pearce | |
| 2005/0099322 A1 | 5/2005 | Wainfan et al. | |
| 2006/0253245 A1 * | 11/2006 | Cera et al. | 701/117 |

FOREIGN PATENT DOCUMENTS

| | | | | |
|---|---|---|---|---|
| JP | 2002074404 A | * | 3/2002 | |
| JP | 2005265641 A | * | 9/2005 | |
| JP | 2006242888 A | * | 9/2006 | |
| JP | 3841924 B2 | * | 11/2006 | |
| JP | 2007071749 A | * | 3/2007 | |
| JP | 2007102238 A | * | 4/2007 | |
| JP | 2007161198 A | * | 6/2007 | |
| JP | 2008183221 A | * | 8/2008 | |

OTHER PUBLICATIONS

Indexing of traffic flow image sequences for traffic information services, Aoyama, H.; Kato, S.; Tsugawa, S.; Intelligent Transportation Systems, 2003. Proceedings. 2003 IEEE, vol. 1, 2003 pp. 529 -533 vol. 1, Digital Object Identifier 10.1109/ITSC.2003.1252009.*

Nomadic control packet-based dynamic route maintenance scheme for adaptive routing in mobile ad hoc networks, Wook Choi; Das, S.K.; Il ho Lee; Local Computer Networks, 2003. LC '03: Proceedings. 28th Annual IEEE International Conference on Oct. 20-24, 2003 pp. 140-149, Digital Object Identifier 10.1109/LCN.2003.1243121.*

Web-based information visualization, Rohrer, R.M.; Swing, E.; Computer Graphics and Applications, IEEE, vol. 17, Issue 4, Jul.-Aug. 1997 pp. 52 -59, Digital Object Identifier 10.1109/38.595269.*

Andre Gueziec , 3D Traffic Visualizations in Real Time, A conference abstract and applications, dated Apr. 2001.*

Path planning with incremental roadmap update for large environments; Tsai-Yen Li; Chih-Ching Chang; Robotics and Automation, 2001. Proceedings 2001 ICRA. IEEE International Conference on; vol. 2, 2001 pp. 1934-1939 vol. 2 Digital Object Identifier 10.1109/Robot.2001.932891.*

Common framework design for development of 3D learning materials in virtual space Sasaki, H.; Iwasaki, S.; Takeya, M.; Computers in Education, 2002. Proceedings. International Conference on Dec. 3-6, 2002 pp. 1128-1131 vol. 2.*

Web-based information visualization; Rohrer, R.M.; Swing, E.; Computer Graphics and Applications, IEEE; vol. 17, Issue 4, Jul.-Aug. 1997 pp. 52 -59; Digital Object Identifier 10.1109/38.595269; Digital Object Identifier 10.1109/INFVIS.1999.801867.*

An advanced microscopic traffic simulation approach for modeling ITS applications; Yunlong Zhang; Owen, L.E.; Systems, Man, and Cybernetics, 1998. 1998 IEEE International Conference on; vol. 4, Oct. 11-14, 1998 pp. 3228-3233 vol. 4 Digital Object Identifier 10.1109/ICSMC.1998.726500.*

Nomadic control packet-based dynamic route maintenance scheme for adaptive routing in mobile ad hoc networks; Wook Choi; Das, S.K.; Il ho Lee; Local Computer Networks, 2003. LCN '03. Proceedings. 28th Annual IEEE International Conference on Oct. 20-24, 2003 pp. 140 -149; Digital Object Identifier 10.1109/LCN.2003.1243121.*

Indexing of traffic flow image sequences for traffic information services; Aoyama, H.; Kato, S.; Tsugawa, S.; Intelligent Transportation Systems, 2003. Proceedings. 2003 IEEE; vol. 1, 2003 pp. 529 -533 vol. 1; Digital Object Identifier 10.1109/ITSC.2003.1252009.*

Interactive Navigation of Heterogeneous Agents Using Adaptive Roadmaps;Gayle, R.; Sud, A.; Andersen, E.; Guy, S.J.; Lin, M.C.; Manocha, D.;Visualization and Computer Graphics, IEEE Transactions on, vol. 15, Issue 1, Jan.-Feb. 2009 pp. 34-48; Digital Object Identifier 10.1109/TVCG.2008.84.*

ATOMS: Air Traffic Operations and Management Simulator; Alam, S.; Abbass, H.A.; Barlow, M.; Intelligent Transportation Systems, IEEE Transactions on, vol. 9, Issue 2, Jun. 2008 pp. 209 - 225, Digital Object Identifier 10.1109/TITS.2008.922877.*

Efficient particle filtering for road-constrained target tracking; Yang Cheng; Singh, T.; Aerospace and Electronic Systems, IEEE Transactions on; vol. 43, Issue 4, Oct. 2007 pp. 1454-1469; Digital Object Identifier 10.1109/TAES.2007.4441751.*

Map Matching in Road Crossings of Urban Canyons Based on Road Traverses and Linear Heading-Change Model; Xiaoguo Zhang; Qing Wang; Dejun Wan; Instrumentation and Measurement, IEEE Transactions on; vol. 56, Issue 6, Dec. 2007 pp. 2795-2803; Digital Object Identifier 10.1109/TIM.2007.908116.*

Information dissemination in self-organizing intervehicle networks; Wischhof, L.; Ebner, A.; Rohling, H.; Intelligent Transportation Systems, IEEE Transactions on; vol. 6, Issue 1, Mar. 2005 pp. 90 - 101; Digital Object Identifier 10.1109/TITS.2004.842407.*

Continuous mapping for road map assisted localization; Hasberg, Carsten; Hensel, Stefan; Information Fusion, 2009. Fusion '09. 12th International Conference on, Jul. 6-9, 2009 pp. 2075-2082.*

TBD: Trajectory-Based Data Forwarding for Light-Traffic Vehicular Networks; Jaehoon Jeong; Shuo Guo; Yu Gu; Tian He; Du, D.; Distributed Computing Systems, 2009. ICDCS '09. 29th IEEE International Conference on, Jun. 22-26, 2009 pp. 231 - 238; Digital Object Identifier 10.1109/ICDCS.2009.11.*

Using 3D road geometry to optimize heavy truck fuel efficiency; Wei Huang; Bevly, D.M.; Schnick, S.; Xiaopeng Li; Intelligent Transportation Systems, 2008. ITSC 2008. 11th International IEEE Conference on, Oct. 12-15, 2008 pp. 334-339 Digital Object Identifier 10.1109/ITSC.2008.4732656.*

Integrating Spline Curves in Road Constraint Object Tracking; Hasberg, C.; Hensel, S.; Westenkirchner, M.; Bach, K.; Intelligent Transportation Systems, 2008. ITSC 2008. 11th International IEEE Conference on, Oct. 12-15, 2008 pp. 1009-1014, Digital Object Identifier 10.1109/ITSC.2008.4732568.*

Road map assisted ground target tracking; Streller, D.; Information Fusion, 2008 11th International Conference on Jun. 30, 2008-Jul. 3, 2008 pp. 1 -7; Digital Object Identifier 10.1109/ICIF.2008.4632341.*

Model-based estimation of off-highway road geometry using single-axis LADAR and inertial sensing; Cremean, L.B.; Murray, R.M.; Robotics and Automation, 2006. ICRA 2006. Proceedings 2006 IEEE International Conference on; May 15-19, 2006 pp. 1661-1666; Digital Object Identifier 10.1109/ROBOT.2006.1641945.*

AReViRoad : a traffic road simulator to learn how to behave; Herviou, D.; Maisel, E.; Cyberworlds, 2005. International Conference on; Nov. 23-25, 2005 pp. 7-262; Digital Object Identifier 10.1109/CW.2005.21.*

"Travlink Project Concept Definition and Preliminary System Design"—Westinghouse Electric Corporation, Apr. 1994. Department of Transportation's—"Intelligent Transportation Systems (ITS) Projects"—U.S. Department of Transportation (cited by other).*

Award Abstract #0349460 for SBIR Phase II: Animated Real-Time Road Traffic Visualization for Broadcast and the Internet, National Science Foundation, Initial Amendment Date: Jan. 7, 2004, first date of publication: unknown, 2 pages.

Product brochure for "Curious World Maps—Curious Map Presenter." Curious Software, downloaded from web site: http://www.curious-software.com/pdfs/Traffic_Flow.pdf, download date: Mar. 16, 2006, product release date: unknown, 1 page.

News Release: "Curious Software at NAB 2006: Curious Traffic Flow," downloaded from web site: http://www.curious-software.com/news/2006/2006_02.html, download date: Apr. 17, 2006, New release date: Mar. 2006, 2 pages.

News Release: "Curious Software is using the NAB 2006 platform to showcase its revolutionary new Curious Traffic Flow," downloaded from web site: http://www.vizrt.com/perl/print?document=http://www.vizrt.com/db/106/10/33/document1010.ehtml, download date: Mar. 16, 2006, original publication date: unknown, 2 pages.

* cited by examiner

```
<?xml version="1.0" encoding="UTF-8"?>
<INCIDENTS>
   <METROAREAID VALUE="57">
   <INCIDENT ID="1168344">
      <DESCRIPTION><![CDATA[ WESTHEIMER RD at S POST OAK BLVD - blocking All lanes - Fun Run]]></DESCRIPTION>
      <GEOLOCATION LATITUDE="29.7406" LONGITUDE="-95.4609"/>
      <CRITICALITY VALUE="2">2</CRITICALITY>
      <LOCATION><![CDATA[HOUSTON]]></LOCATION>
      <DIRECTION VALUE=""/>
      <TYPE ID="EVENT">Event</TYPE>
      <STARTTIME FORMATSTRING="MM/dd/yyyy hh:mm:ss a" VALUE="03/18/2003 13:52:00 PM"/>
      <ENDTIME FORMATSTRING="MM/dd/yyyy hh:mm:ss a" VALUE="03/01/2004 14:22:00 PM"/>
      <ZONE>Harris County</ZONE>
      <INCIDENT_CLASS VALUE="EVENT"/>
   </INCIDENT>
   <INCIDENT ID="1168345">
      <DESCRIPTION><![CDATA[ MURWORTH DR at KIRBY DR - blocking All lanes - Rodeo]]></DESCRIPTION>
      <GEOLOCATION LATITUDE="29.6848" LONGITUDE="-95.41243"/>
      <CRITICALITY VALUE="2">2</CRITICALITY>
      <LOCATION><![CDATA[HOUSTON]]></LOCATION>
      <DIRECTION VALUE=""/>
      <TYPE ID="EVENT">Event</TYPE>
      <STARTTIME FORMATSTRING="MM/dd/yyyy hh:mm:ss a" VALUE="03/18/2003 13:54:00 PM"/>
      <ENDTIME FORMATSTRING="MM/dd/yyyy hh:mm:ss a" VALUE="03/01/2004 14:24:00 PM"/>
      <ZONE>Harris County</ZONE>
      <INCIDENT_CLASS VALUE="EVENT"/>
   </INCIDENT>
   <INCIDENT ID="1168346">
      <DESCRIPTION><![CDATA[ E GREENWAY PLZ at NORFOLK ST - blocking All lanes - Protesting]]></DESCRIPTION>
      <GEOLOCATION LATITUDE="29.7307" LONGITUDE="-95.44151"/>
      <CRITICALITY VALUE="2">2</CRITICALITY>
      <LOCATION><![CDATA[HOUSTON]]></LOCATION>
      <DIRECTION VALUE=""/>
      <TYPE ID="EVENT">Event</TYPE>
      <STARTTIME FORMATSTRING="MM/dd/yyyy hh:mm:ss a" VALUE="03/18/2003 13:55:00 PM"/>
      <ENDTIME FORMATSTRING="MM/dd/yyyy hh:mm:ss a" VALUE="03/01/2004 14:25:00 PM"/>
      <ZONE>Harris County</ZONE>
      <INCIDENT_CLASS VALUE="EVENT"/>
   </INCIDENT>
   <INCIDENT ID="1168312">
      <DESCRIPTION><![CDATA[ FONDREN RD at BELLAIRE BLVD - accident]]></DESCRIPTION>
      <GEOLOCATION LATITUDE="29.70509" LONGITUDE="-95.52132"/>
      <CRITICALITY VALUE="2">2</CRITICALITY>
      <LOCATION><![CDATA[HOUSTON]]></LOCATION>
      <DIRECTION VALUE=""/>
      <TYPE ID="ACC">Accident</TYPE>
      <STARTTIME FORMATSTRING="MM/dd/yyyy hh:mm:ss a" VALUE="03/18/2003 13:06:00 PM"/>
      <ENDTIME FORMATSTRING="MM/dd/yyyy hh:mm:ss a" VALUE="03/01/2004 13:36:00 PM"/>
      <ZONE>Harris County</ZONE>
      <INCIDENT_CLASS VALUE="INCIDENT"/>
   </INCIDENT>
</INCIDENTS>
```

FIG. 18

METHOD OF DISPLAYING TRAFFIC FLOW CONDITIONS USING A 3D SYSTEM

CROSS REFERENCE TO RELATED APPLICATION

This application claims the benefit of U.S. Provisional Patent Application No. 60/500,857 filed Sep. 5, 2003 and entitled "Method of Displaying Traffic Flow Conditions Using a 3-D System."

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Traffic information providers have struggled with the ability to convey traffic information in a usable and compelling way for television audiences. Typically, traffic information providers show a video image from a camera or other similar, simple graphic with an arrow pointing to a general area to convey the current state of the traffic conditions.

Graphics used to display traffic flow conditions or other traffic information to a broadcast television or cable network audience are well known in the art. Generally, static graphic images are manually placed on a static background map or web page, which is then rendered into a NTSC or similar signal for delivery to viewers. FIG. 1 depicts an example of such a system presently used to convey traffic information on television using a flat map. Television announcers use flat static maps containing traffic information as backdrops to talk over and convey traffic conditions.

Two-dimensional ("2D") displays limited to a static display of colors and objects with no motion to depict current road conditions are also known in the art. The status colors do not change to reflect real-time, actual road conditions, since a static web image must initially be created from traffic flow data to generate the 2D display. Rather, a user manually places selected icons on the display map when it is desirable to add an additional visual traffic feature or item.

A known traffic display system designed and utilized by Mobility Technologies, Inc., converts real-time traffic flow data from a proprietary system into an animated, color-coded 2D video format, such as NTSC, SDI, AVI, DPS or MPEG. This product is described in co-pending U.S. patent application Ser. No. 10/447,530, filed May 29, 2003, entitled "Method of Displaying Traffic Flow Data Representing Traffic Conditions," the disclosure of which is incorporated herein by reference. FIG. 2 shows an example of the system described in U.S. patent application Ser. No. 10/447,530 which conveys traffic flow conditions to viewers. In FIG. 2, traffic information is depicted using different colors and animation to represent different current traffic conditions on the road system. The status colors (i.e., green, yellow, red) and corresponding animation of cars (i.e., fast, moderate, slow) represent the traffic flow data for a particular portion, or link of the road system. Although this data results from real-time sensor or flow data, there is no direct integration of any traffic congestion or other incident data with the traffic conditions shown on the animated display map.

U.S. patent application Ser. No. 10/611,494, filed Jun. 30, 2003, entitled "Method of Creating a Virtual Traffic Network," the disclosure of which is incorporated herein by reference, describes a Virtual Geo-Spatial Traffic Network ("VGSTN") which provides spatially oriented traffic data and information, including flow data, incidents, events, congestion and news all synaptically integrated in a unified virtual network. The contents of the VGSTN are represented in several ways, including a 2D animated traffic flow display representation that is output in various video formats. Such representations are limited by a 2D view of the traffic conditions as well as the inability to cover a large road system or portion thereof without overwhelming a viewer. FIG. 3 depicts a representation of a TV output of the 2D traffic flow display used with the VGSTN application.

Although integrated traffic systems have been added to show animated, real-time traffic flow conditions, none of the existing methods of displaying traffic conditions has the ability to accurately display the traffic conditions of an entire region or road system in a detailed, multi-dimensional fashion. Traffic information providers have struggled with a method to convey a significant amount of information that allows the viewer to quickly ascertain the traffic conditions of a road system relative to various landmarks, and with the viewer's perspective relative to the direction of travel.

Additionally, although three-dimensional ("3D"), "fly-through" displays have become more popular in scenes and other "produced" television segments (such as weather reporting), these 3D displays have not been leveraged by traffic information providers. 3D technology allows for a more compelling traffic product, and also gives the traffic information provider the ability to convey several pieces of traffic information at once, including traffic flow data and incident data, across an individual roadway or entire road system within a single television broadcast segment.

It would be desirable to convey traffic conditions in an animated or non-animated 3D view, to display traffic conditions in a geo-spatially correct virtual road network, and to display traffic conditions based on proximity of that data to the current view of the display.

The present invention allows for proximity settings of traffic data, thereby managing the traffic information shown to the viewer in a way that is easily viewed. The present invention also allows for animated and non-animated billboards for advertisements along with other signage to be presented within a 3D graphic display. Additionally, using 3D technology allows the television viewer to enjoy watching a portion of the news broadcast that is typically considered a bland and lifeless segment.

BRIEF SUMMARY OF THE INVENTION

Briefly stated, according to a first aspect of the present invention, a computer-implemented method of displaying traffic conditions on a road system includes creating a 3D graphical map of the road system that includes one or more segments. The status of the segments on the 3D graphical map is determined. The status of the segments corresponds to traffic data associated with each segment. A 3D model of the road system is created by combining the 3D graphical map and the status of the segments.

According to a second aspect of the present invention, a 3D model representing traffic conditions on a road system includes a 3D graphical map of the road system that includes one or more segments of the road system. Traffic flow on the 3D graphical map is associated with the segments. The traffic flow corresponds to traffic data associated with the segments.

According to a third aspect of the present invention, a computer-implemented method of displaying traffic conditions on a road system includes creating a graphical 3D map of the road system that includes one or more 3D point locations of the road system. Traffic data associated with the 3D point locations on the graphical map is determined. A 3D model of the road system is created by combining the graphical 3D map and the traffic data associated with the 3D point locations.

According to a fourth aspect of the present invention, a 3D model representing traffic conditions on a road system includes a graphical 3D map of the road system that includes one or more 3D point locations of the road system. Traffic data on the 3D graphical map is associated with the 3D point locations. The traffic data is combined with the 3D graphical map.

According to a fifth aspect of the present invention, a computer-implemented method of displaying traffic conditions on a road system includes creating a 3D graphical map of the road system that includes one or more segments and one or more 3D point locations of the road system. The status of the segments on the 3D graphical map is determined, and corresponds to traffic data associated with each segment. Traffic data associated with the 3D point locations on the graphical map is determined. A 3D model of the road system is created by combining the 3D graphical map, the status of the segments and the traffic data associated with the 3D point locations.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The patent or application file contains at least one drawing executed in color. Copies of this patent or patent application publication with color drawing(s) will be provided by the Office upon request and payment of the necessary fee.

In the drawings:

FIG. 1 is a static traffic flow map according to a method of displaying traffic information generally known in the art;

FIG. 2 is an animated color-coded traffic flow map according to another method of displaying traffic information generally known in the art;

FIG. 3 is an animated, color-coded traffic flow map including traffic data from a VGSTN according to another method of displaying traffic information generally known in the art;

FIG. 4 is a 3D display of traffic conditions according one embodiment of the present invention;

FIG. 5 is a 3D display of traffic conditions on a road system according to another embodiment of the present invention;

FIG. 6 is a block diagram of the TV3D system in accordance with the present invention;

FIG. 7 is an example of a user interface in accordance with the present invention;

FIG. 8 is a display of a planned route system in accordance with the present invention;

FIG. 9 is a digitally plotted route system corresponding to FIG. 8 using the mapping software of the present invention;

FIG. 10 is an example of a reference image in accordance with the present invention;

FIG. 11 is an example of a model image corresponding to FIG. 10;

Figure 11:
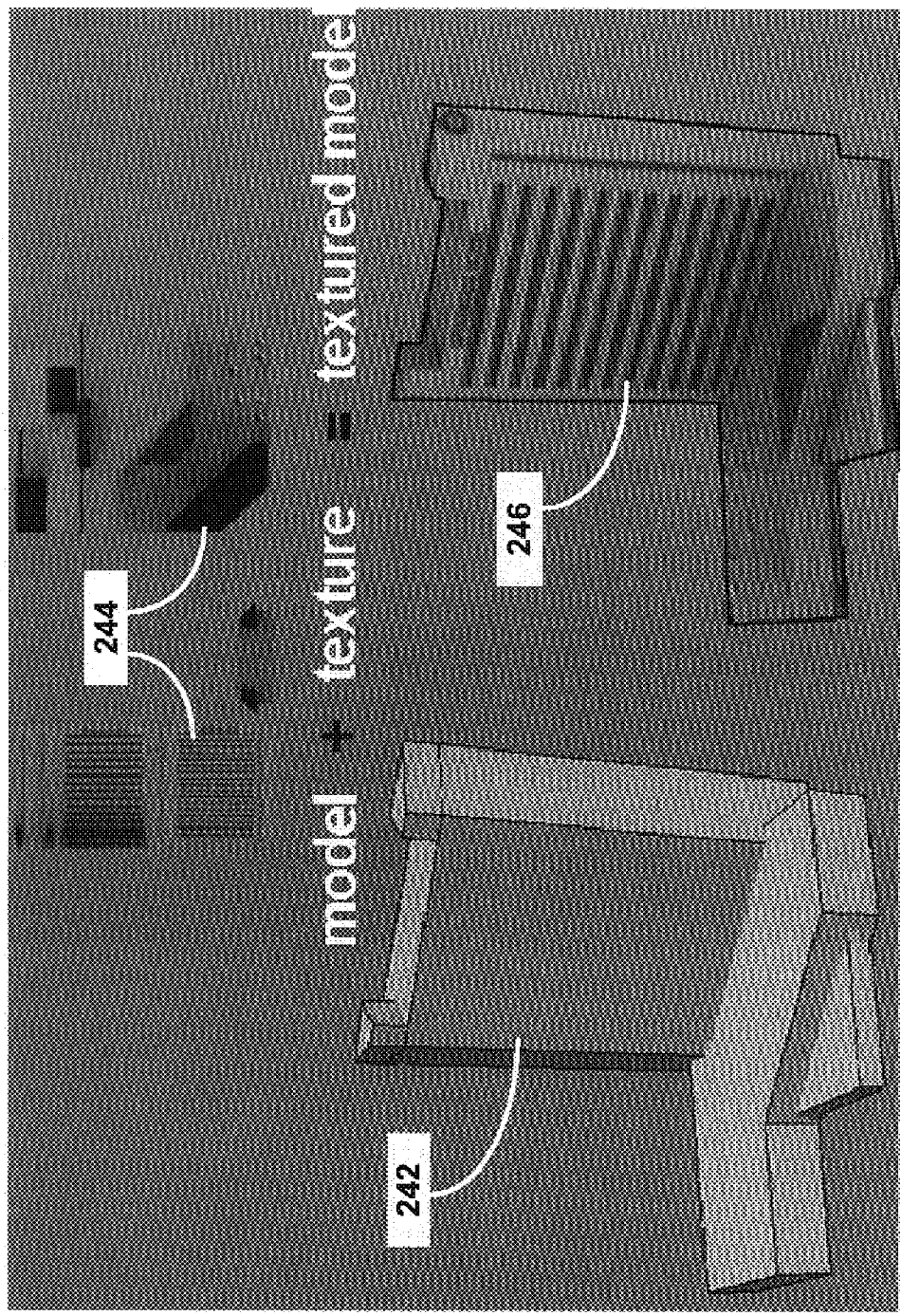
Figure 12:
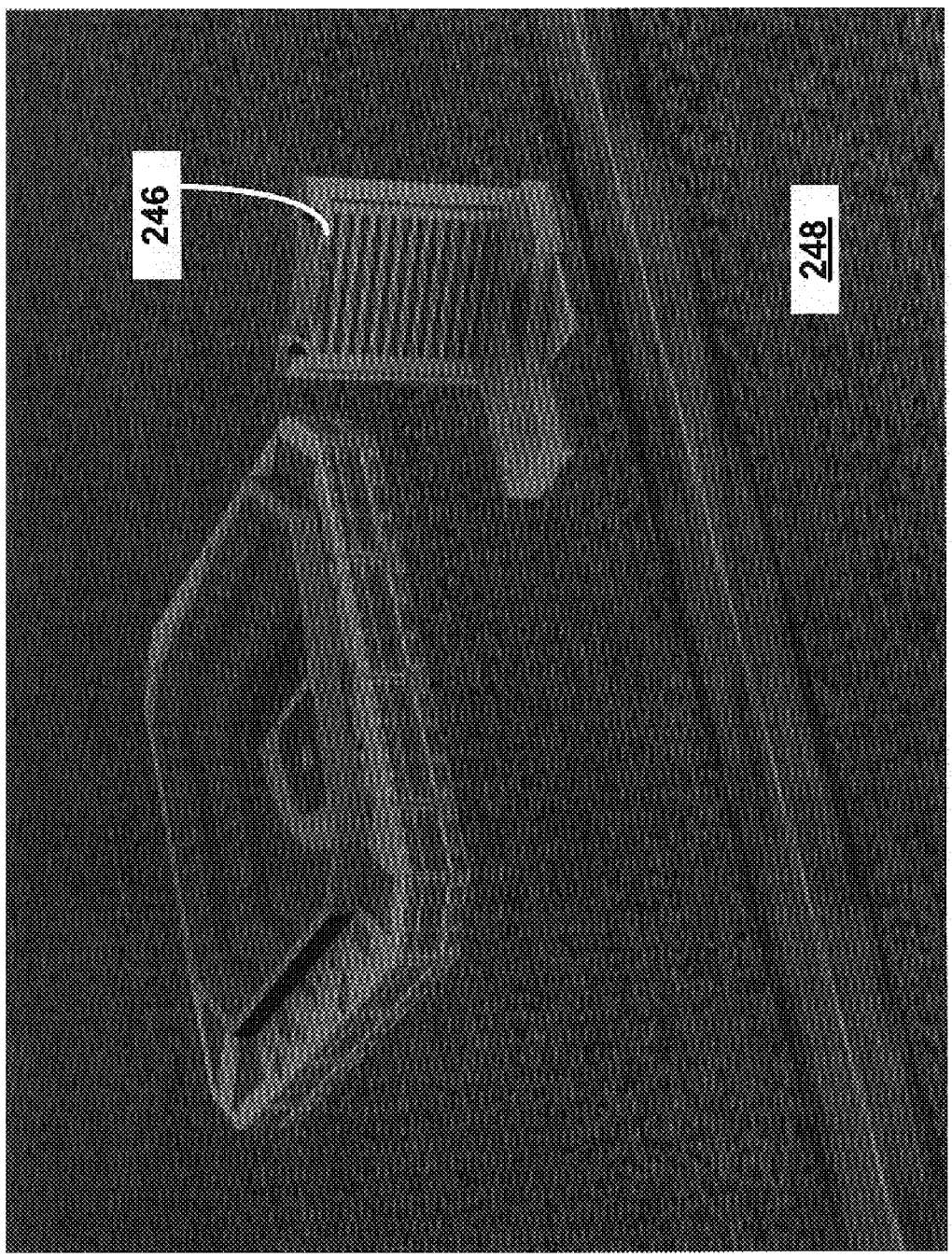
Figure 13:
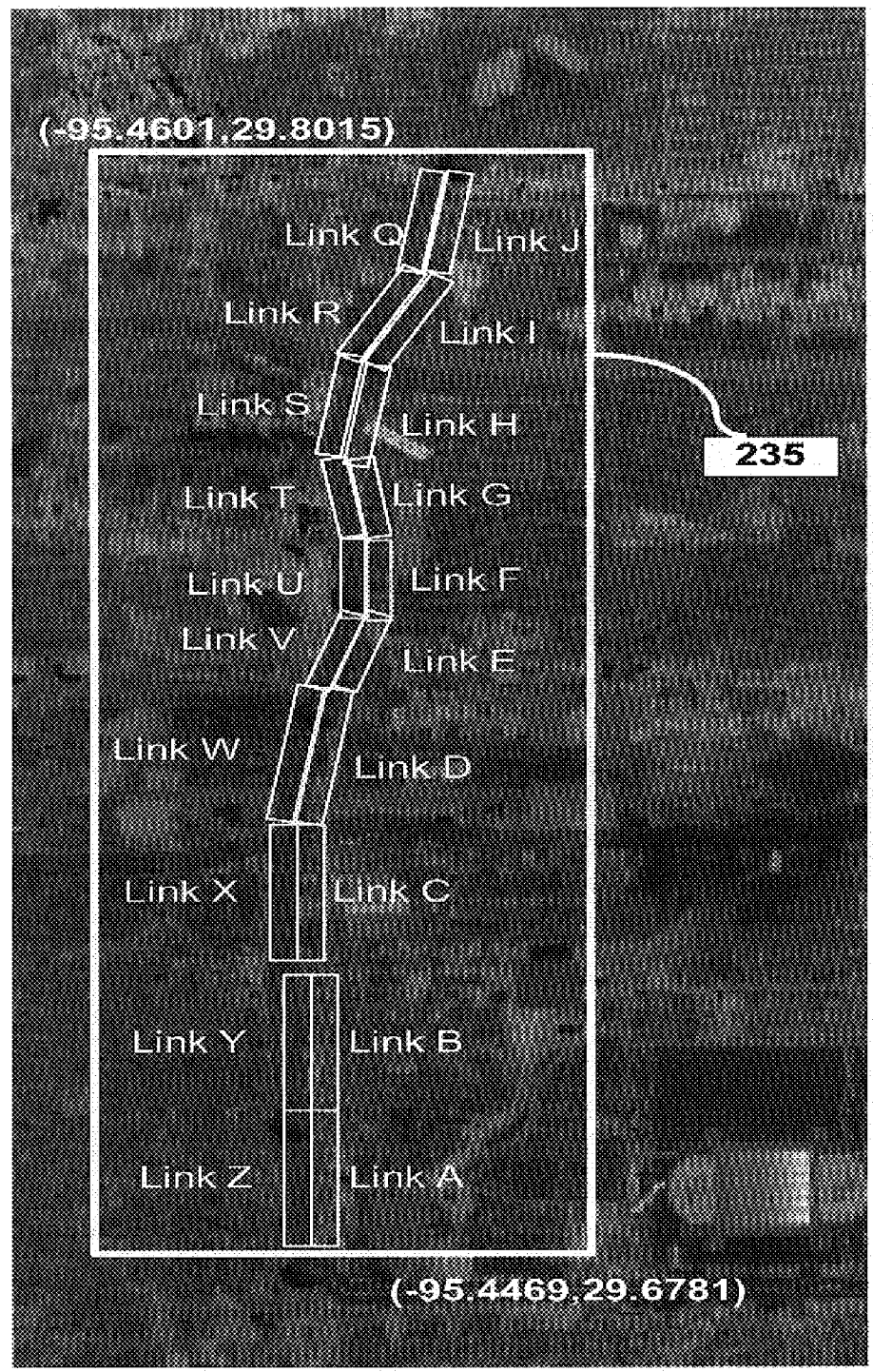
Figure 15:
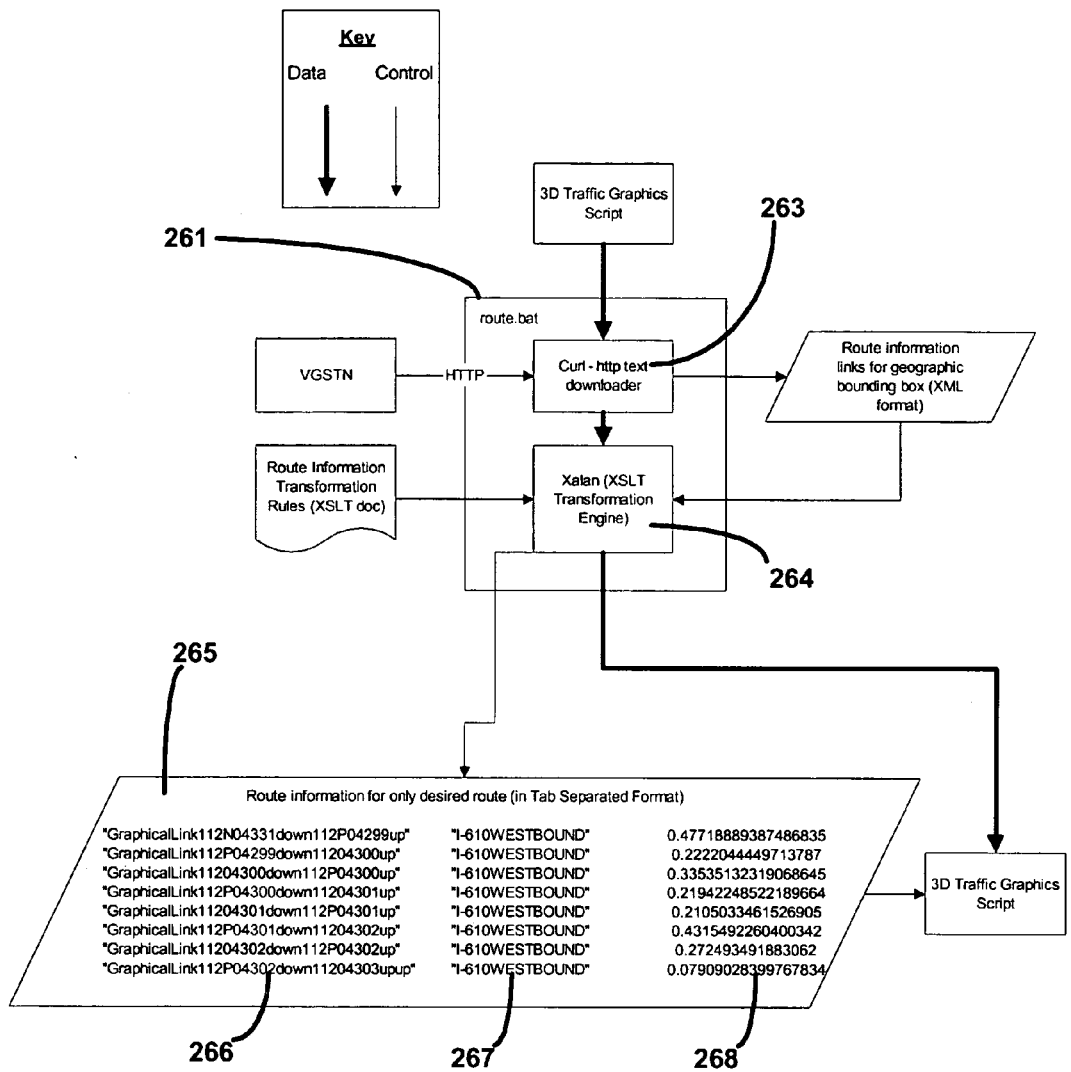
Figure 17:
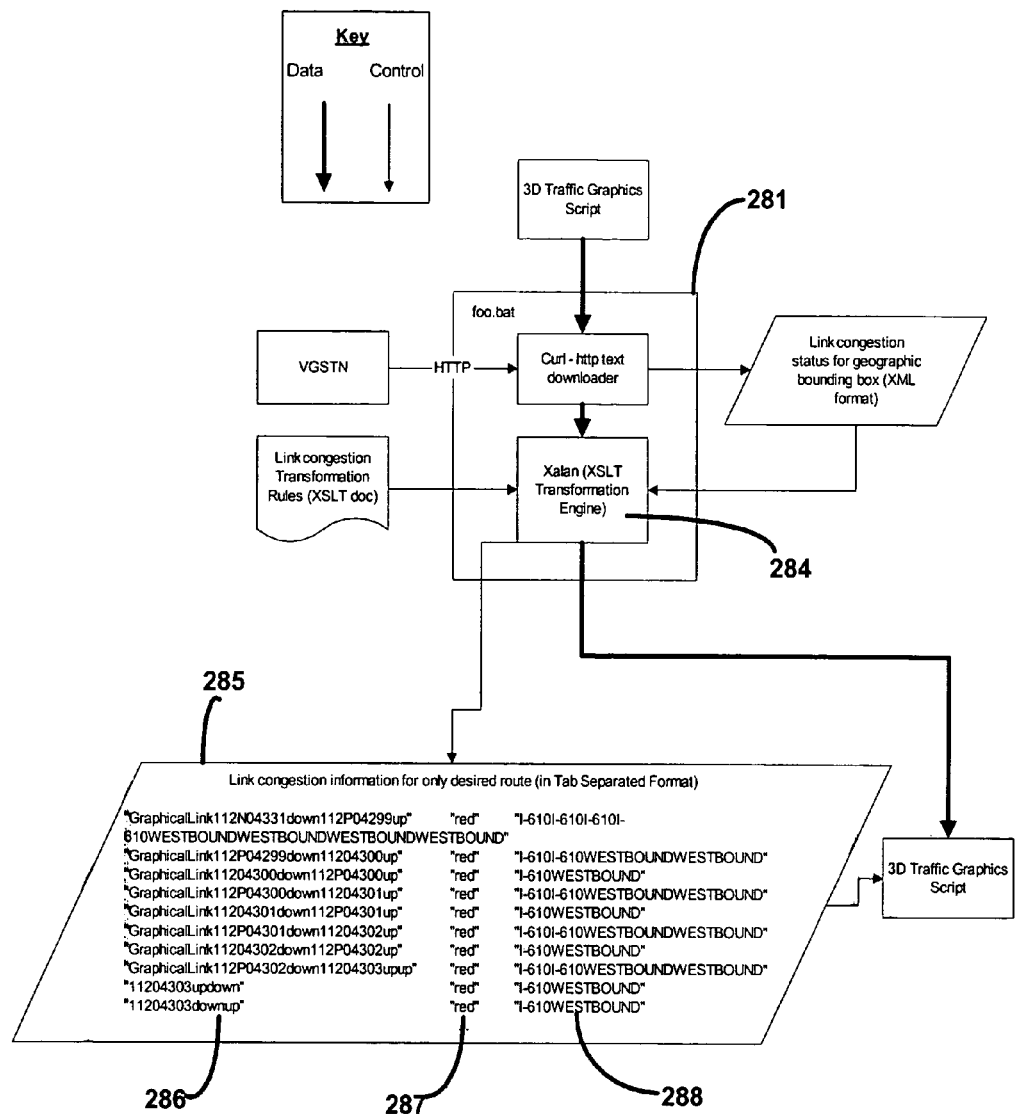
Figure 19:
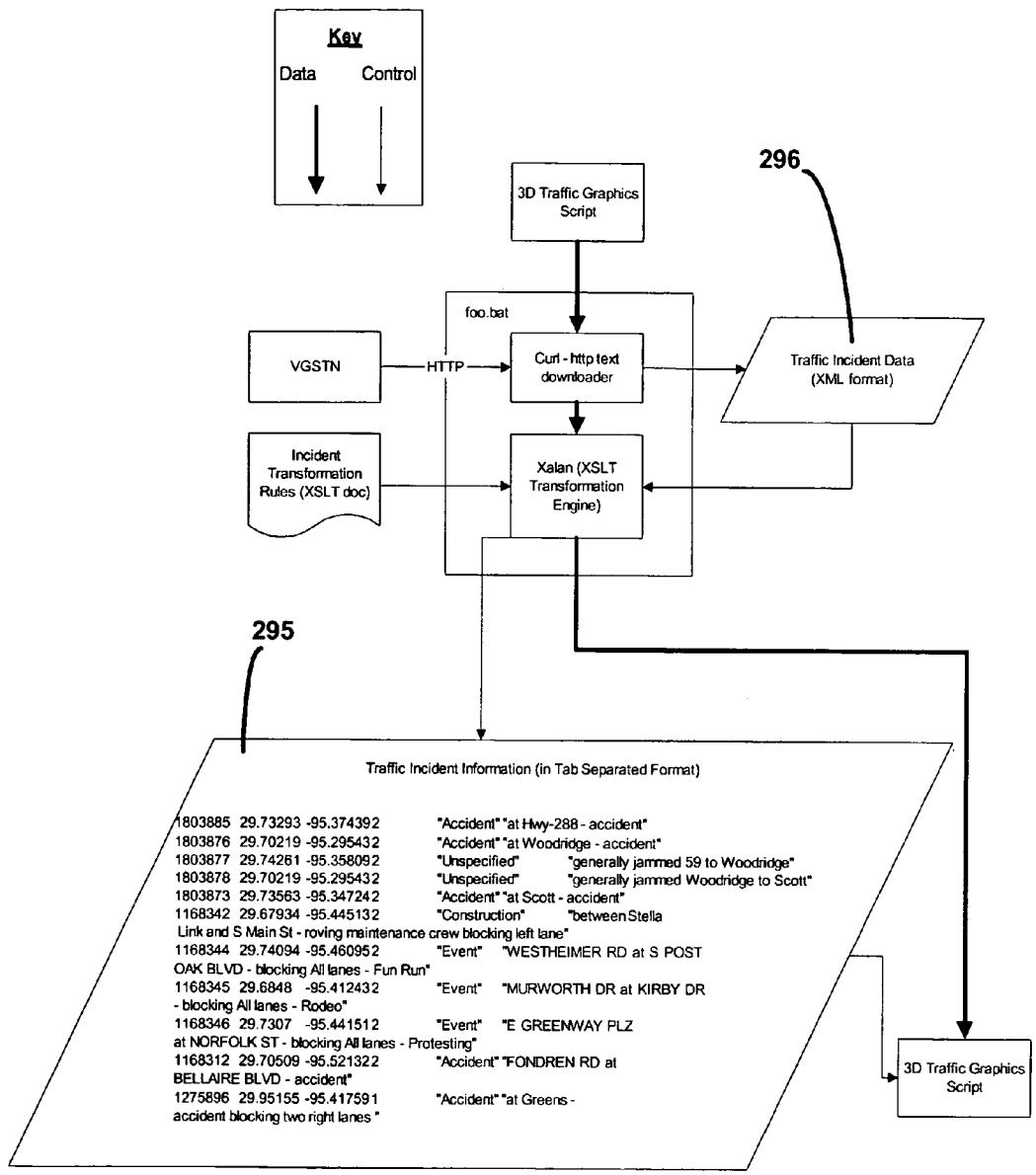
Figure 20:
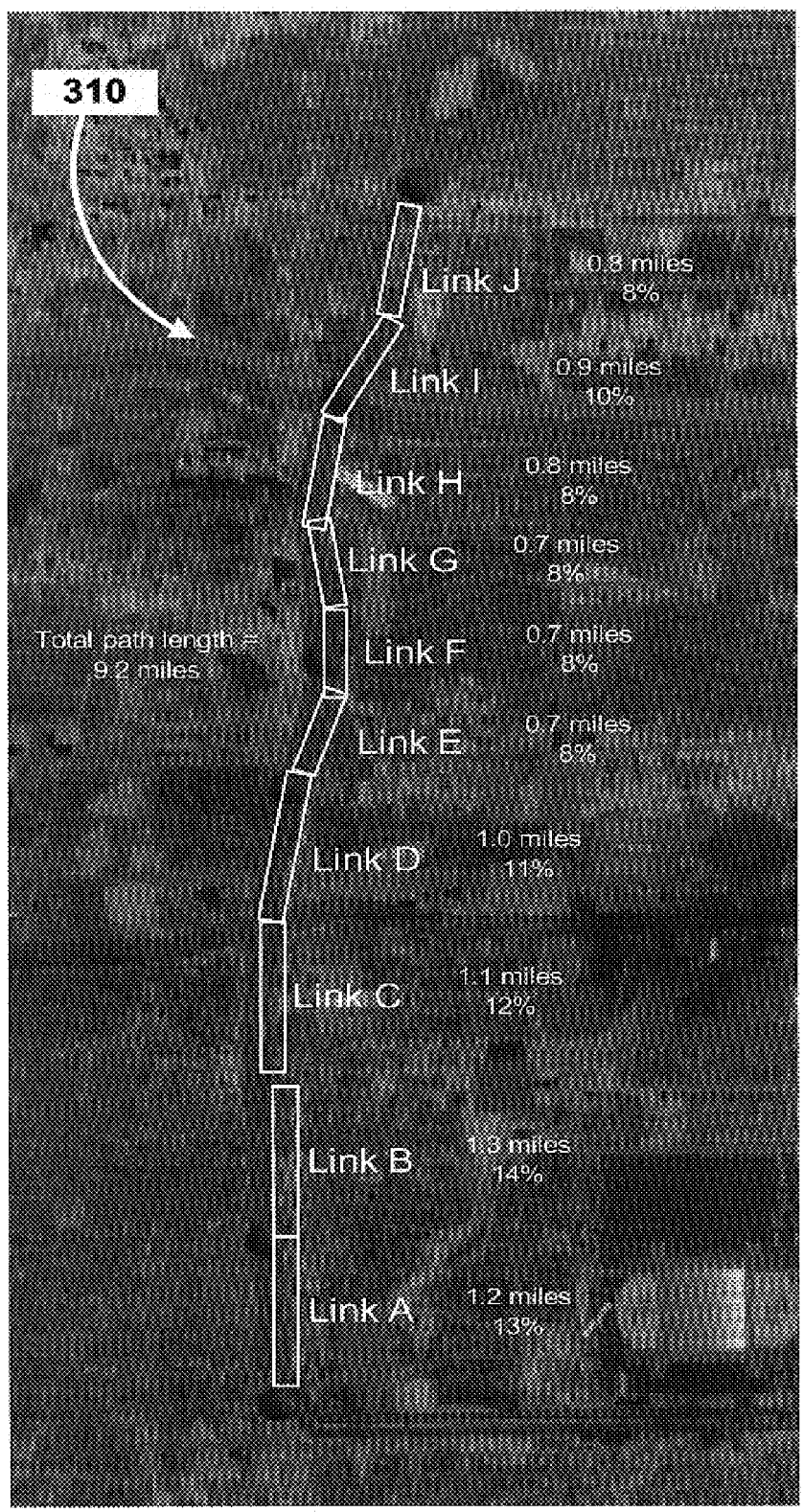
Figure 21:
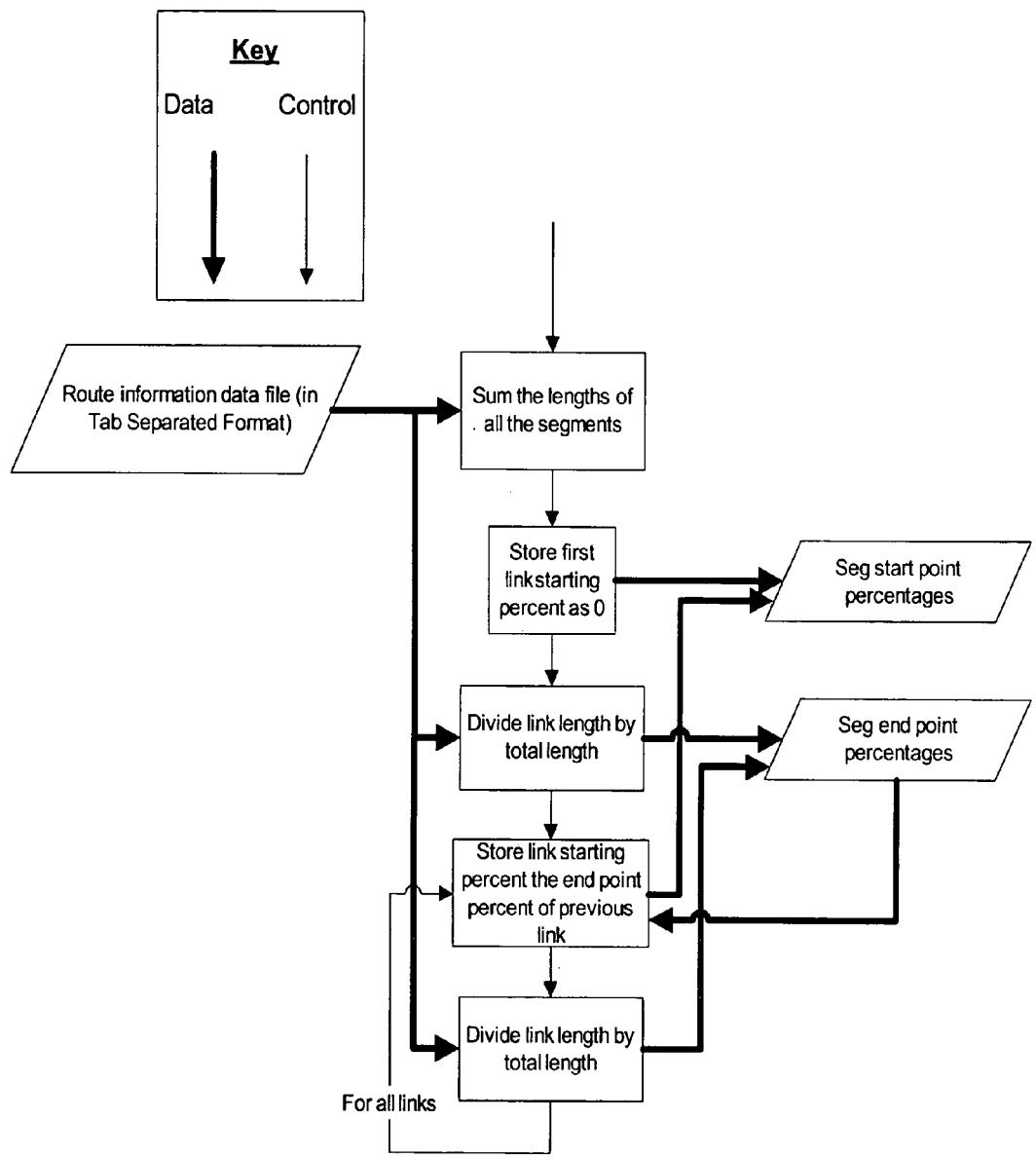
Figure 22:
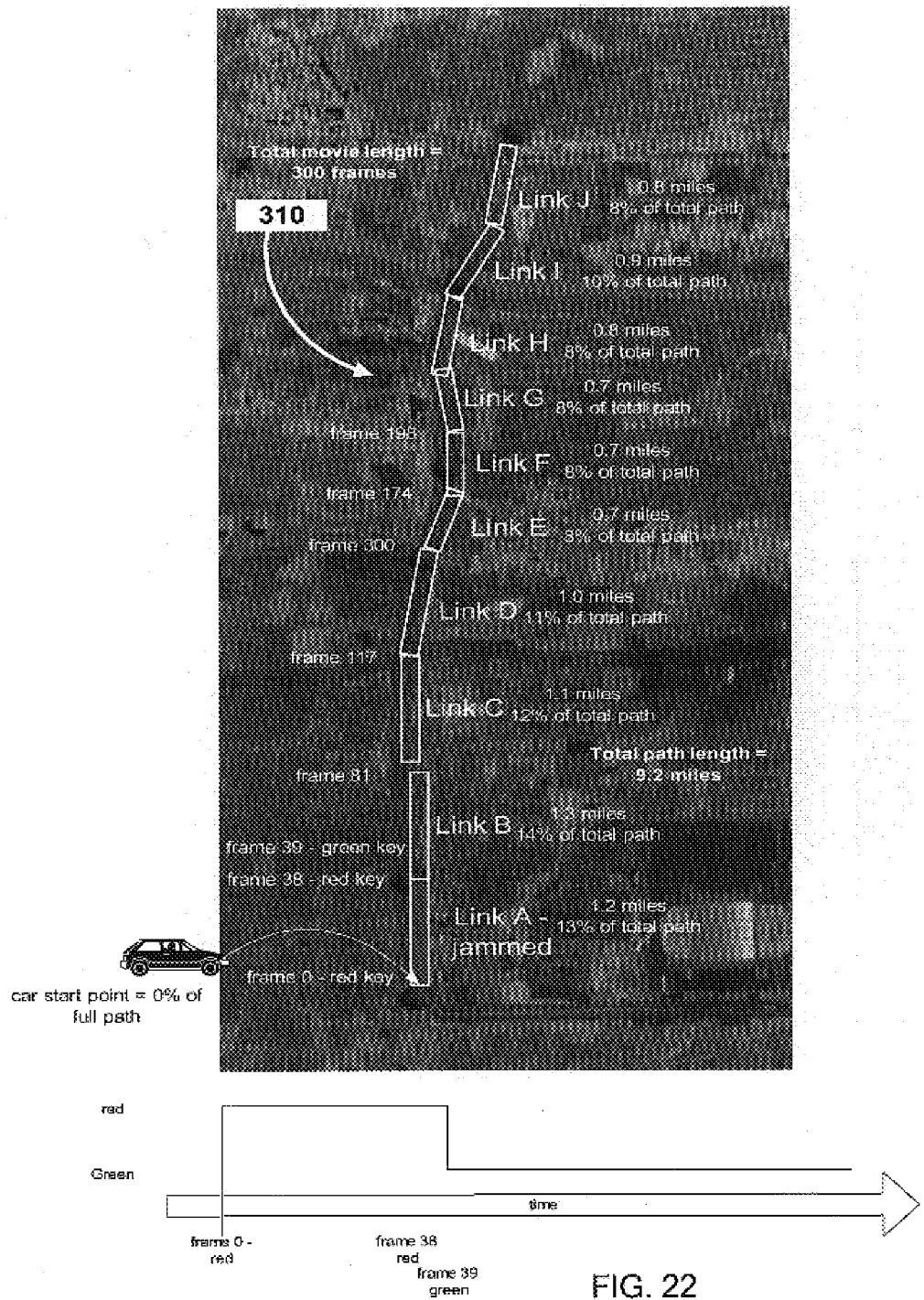
Figure 23:
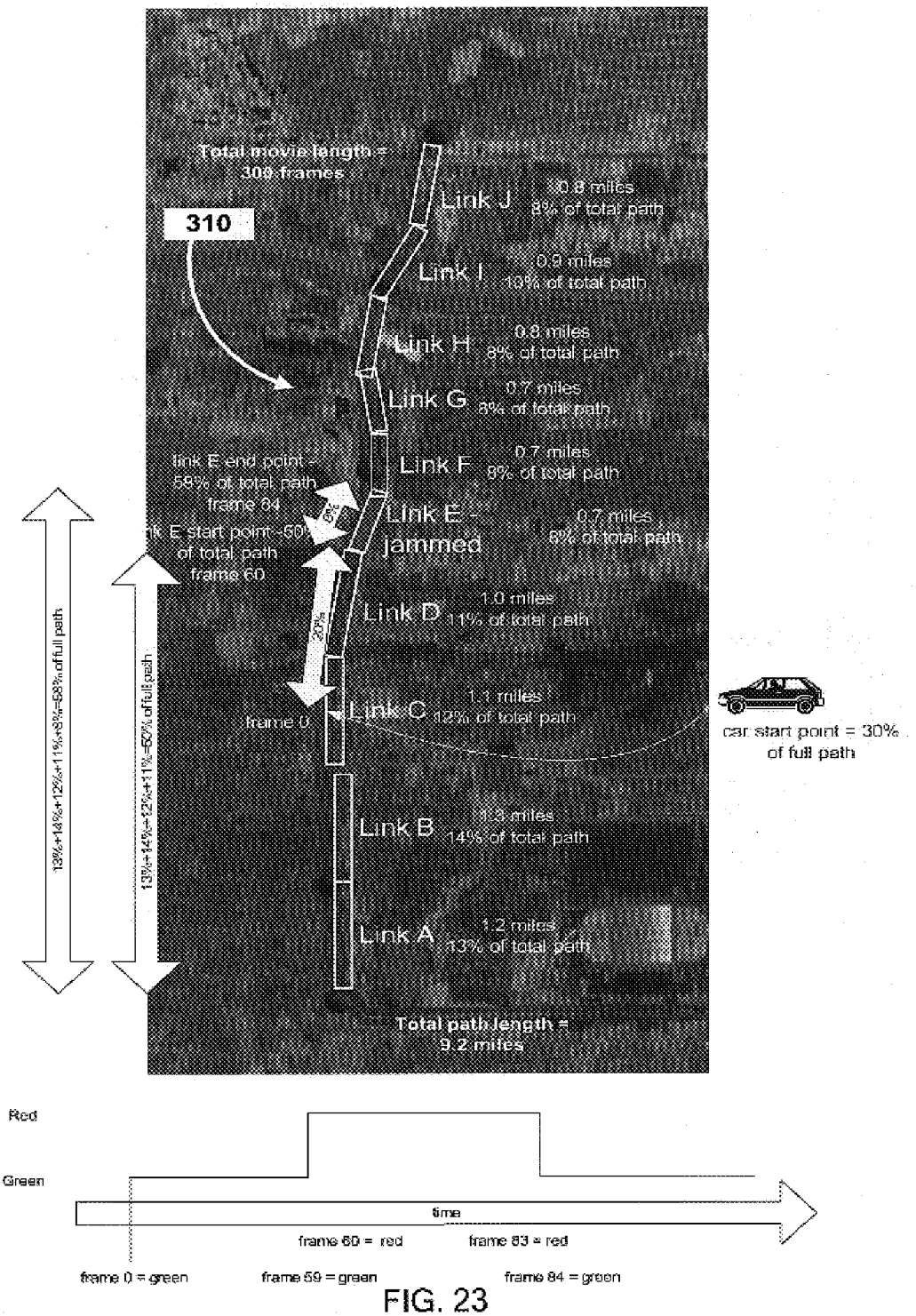
Figure 24:
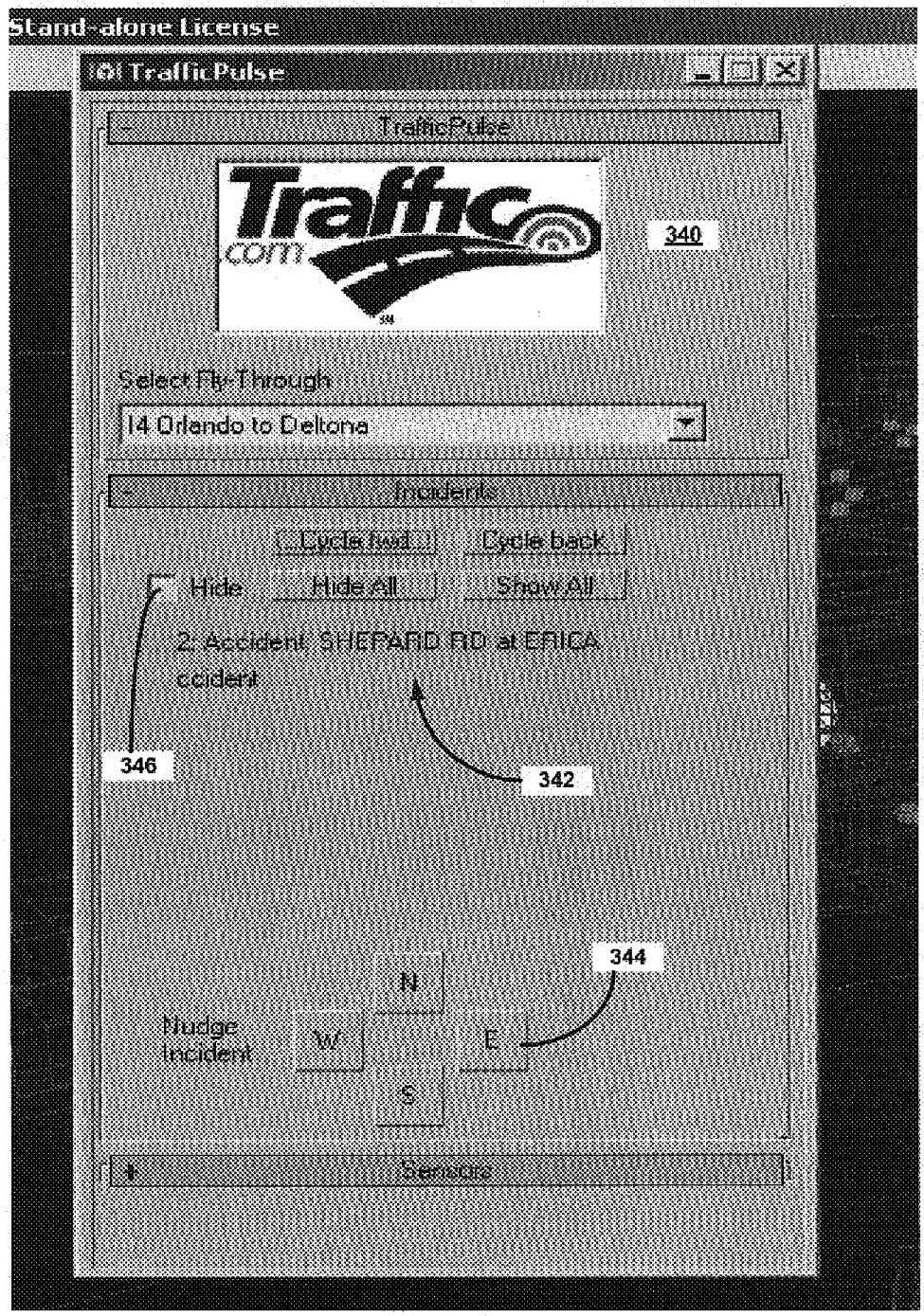
Figure 25:
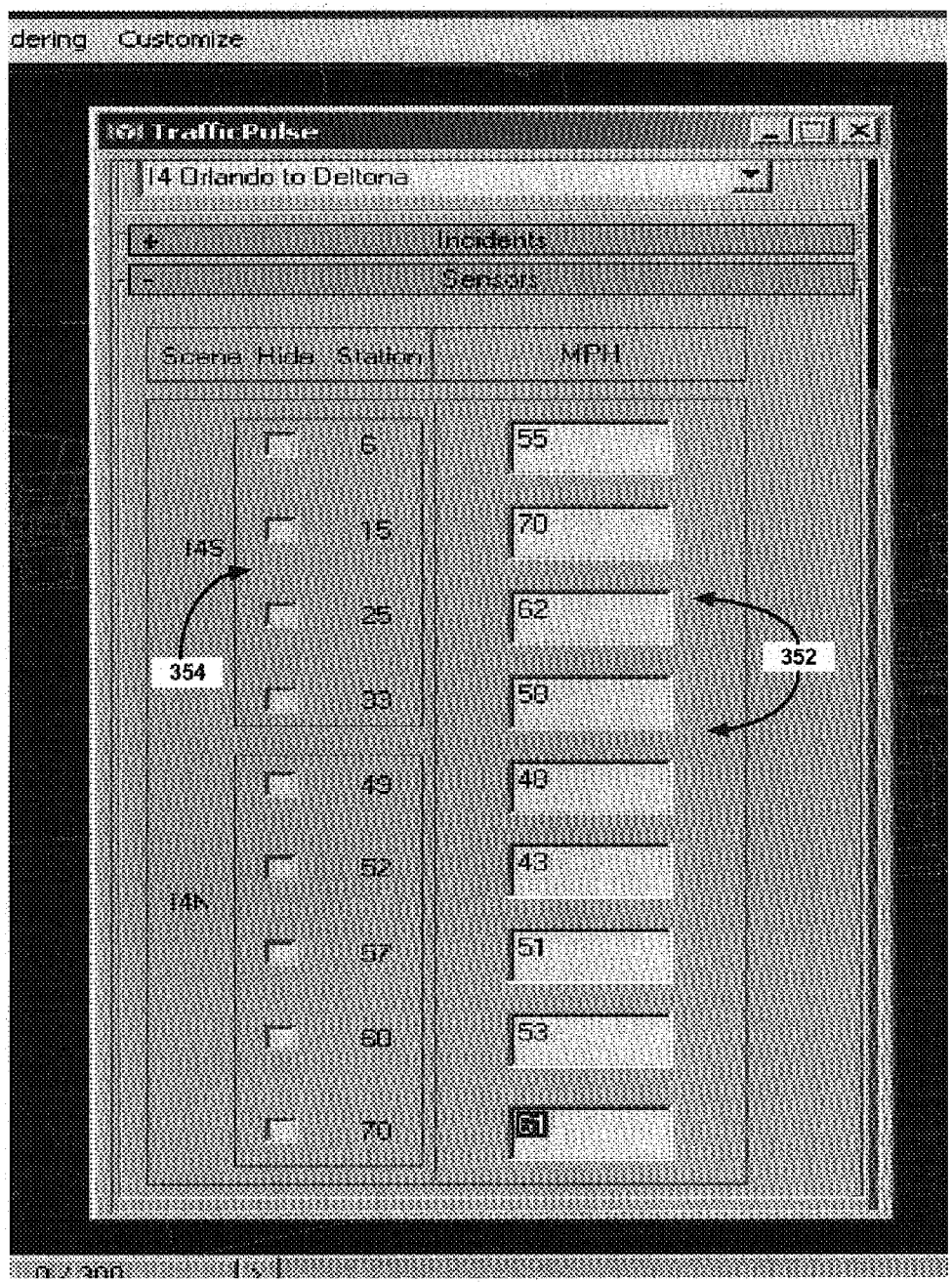
Figure 26:
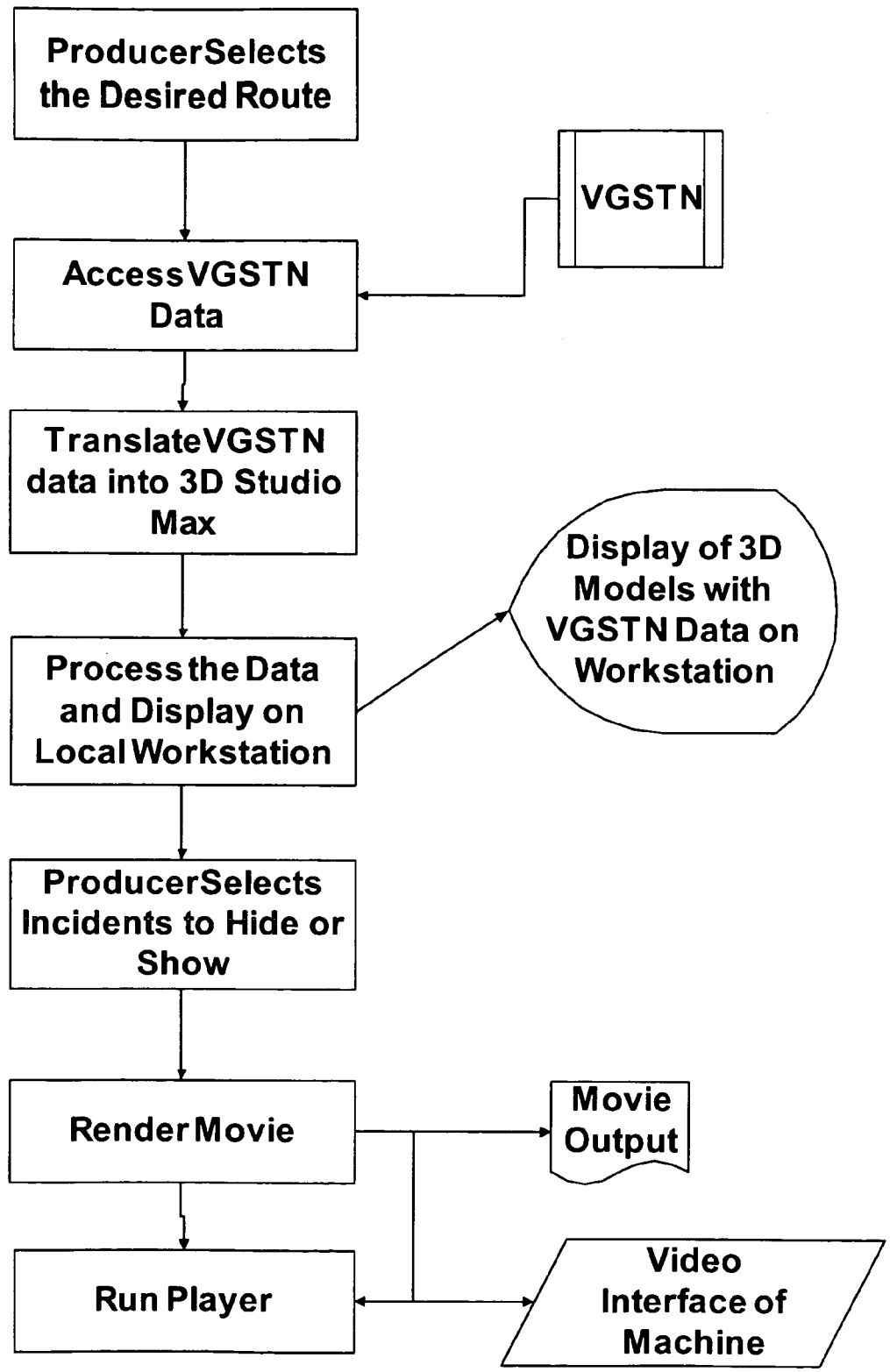

FIG. 12 is a 3D representation of a route in accordance with the present invention using the model of FIG. 11;

FIG. 13 is an example of a route path definition based on a bounding box in accordance with the present invention;

Figure 14:
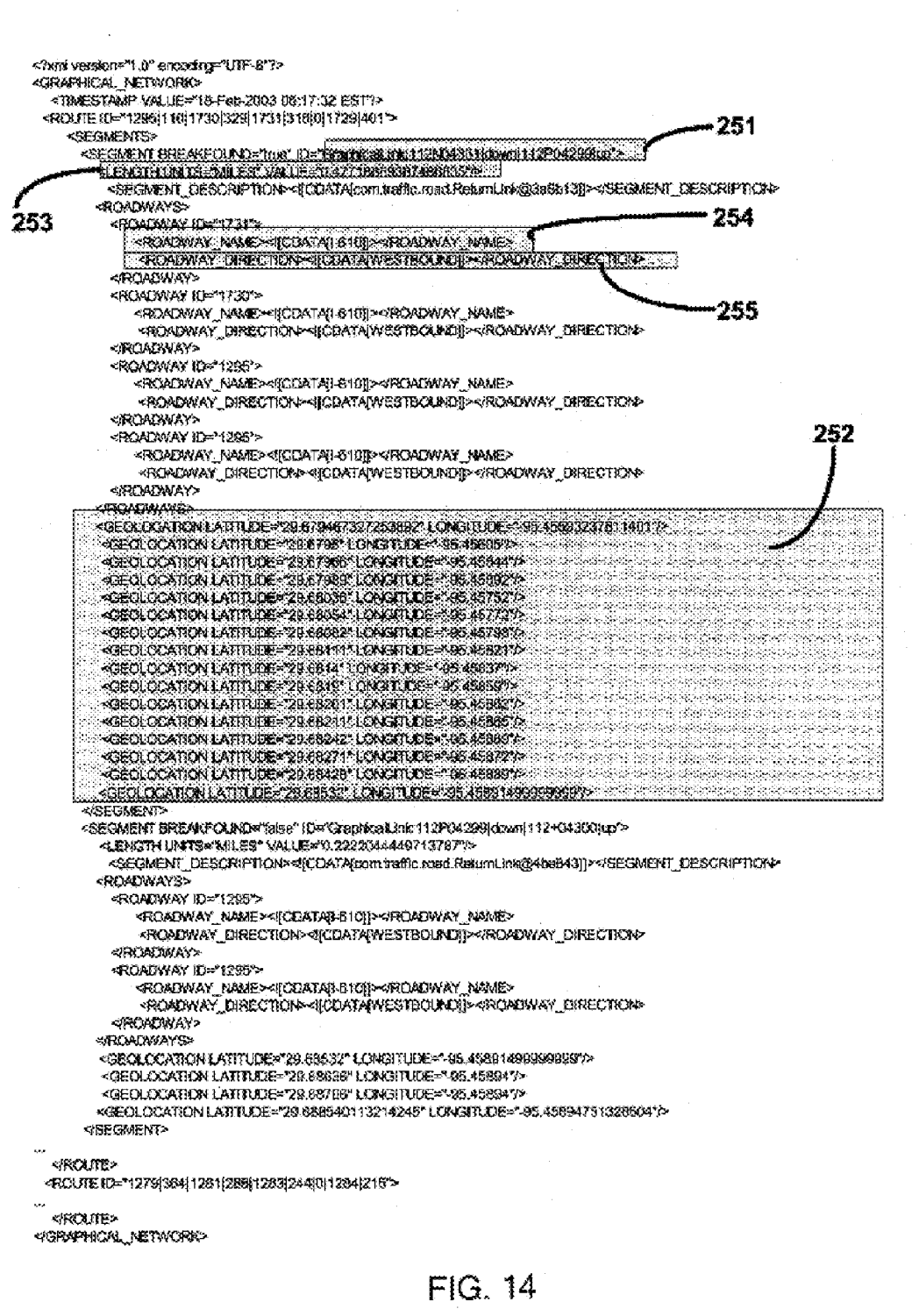

FIG. 14 is a portion of an XML document used to access the 3D graphics map of the VGSTN in accordance with the present invention;

FIG. 15 is a block diagram showing processing of the 3D graphics map in accordance with the present invention;

Figure 16:
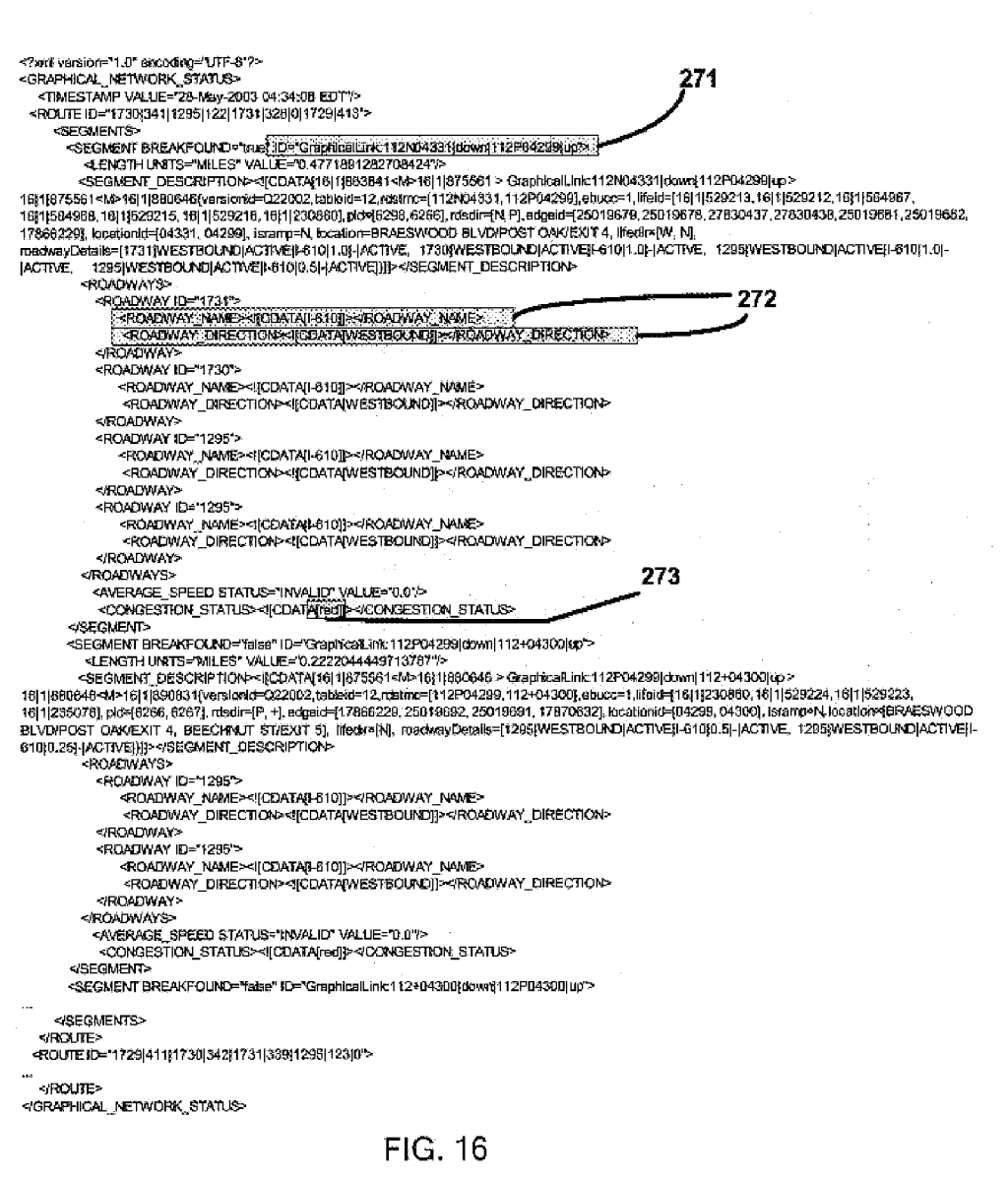

FIG. 16 is a portion of an XML document used to access the dynamic congestion information in accordance with the present invention;

FIG. 17 is a block diagram showing processing of the dynamic congestion information in accordance with the present invention;

FIG. 18 is a portion of an XML document used to access the traffic incident information in accordance with the present invention;

FIG. 19 is a block diagram showing the processing of traffic incident information in accordance with the present invention;

FIG. 20 is an example of a route path used in accordance with the present invention;

FIG. 21 is a block diagram showing calculations used in processing the route path of FIG. 20;

FIG. 22 illustrates car color change calculations of the route path of FIG. 20;

FIG. 23 illustrates additional car color change calculations of the route path of FIG. 20;

FIG. 24 is an example of a user interface in accordance with the present invention;

FIG. 25 is an example of another user interface in accordance with the present invention; and FIG. 26 is a flow diagram summarizing the process of creating a 3D traffic display in accordance with the present invention.

DETAILED DESCRIPTION OF THE INVENTION

The 3D traffic display system ("TV3D") according to the present invention provides an integrated, single 3D dynamic view of traffic flow conditions on a road system. The TV3D utilizes a 3D modeling tool and includes the ability to define camera/route paths through the model for production of a traffic "scene" in a known video format (e.g., NTSC, SDI, MPEG, DPS, AVI, etc). Preferably, the TV3D obtains integrated traffic data reflecting incidents, congestion, and flow data from a VGSTN to generate the 3D display of integrated traffic flow conditions. Preferably, the TV3D is installed at a client location so that the display, or scene, is rendered for traffic reports. The scenes may include landmarks, which include, but are not limited to roadways, structures, places, terrain, as well as animated and/or non-animated billboards for advertising. The landmarks are preferably modeled and rendered as part of each scene. The scenes can be rendered in real-time and/or non real-time, and may contain animated objects therein.

Figure 1:
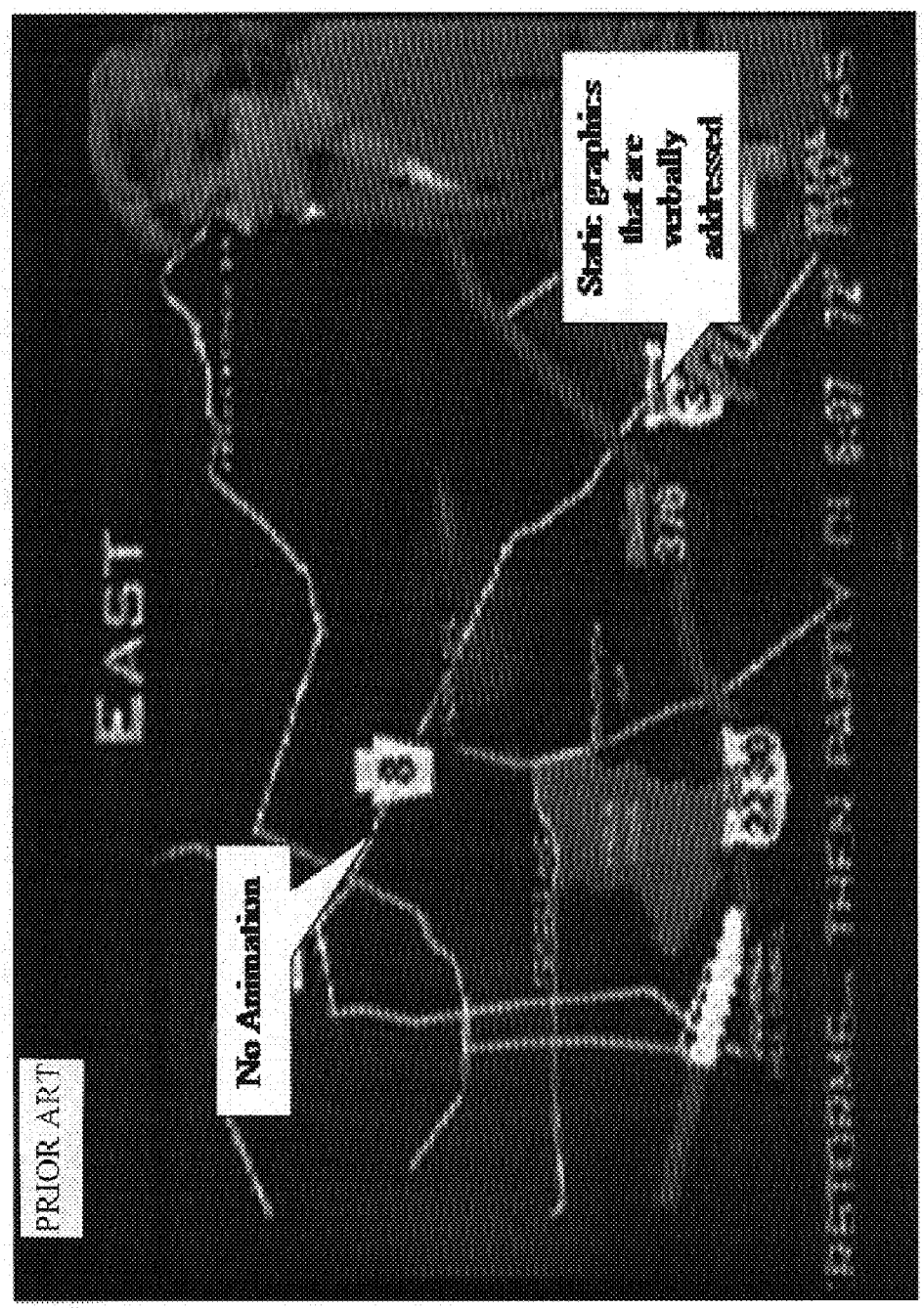
Figure 2:
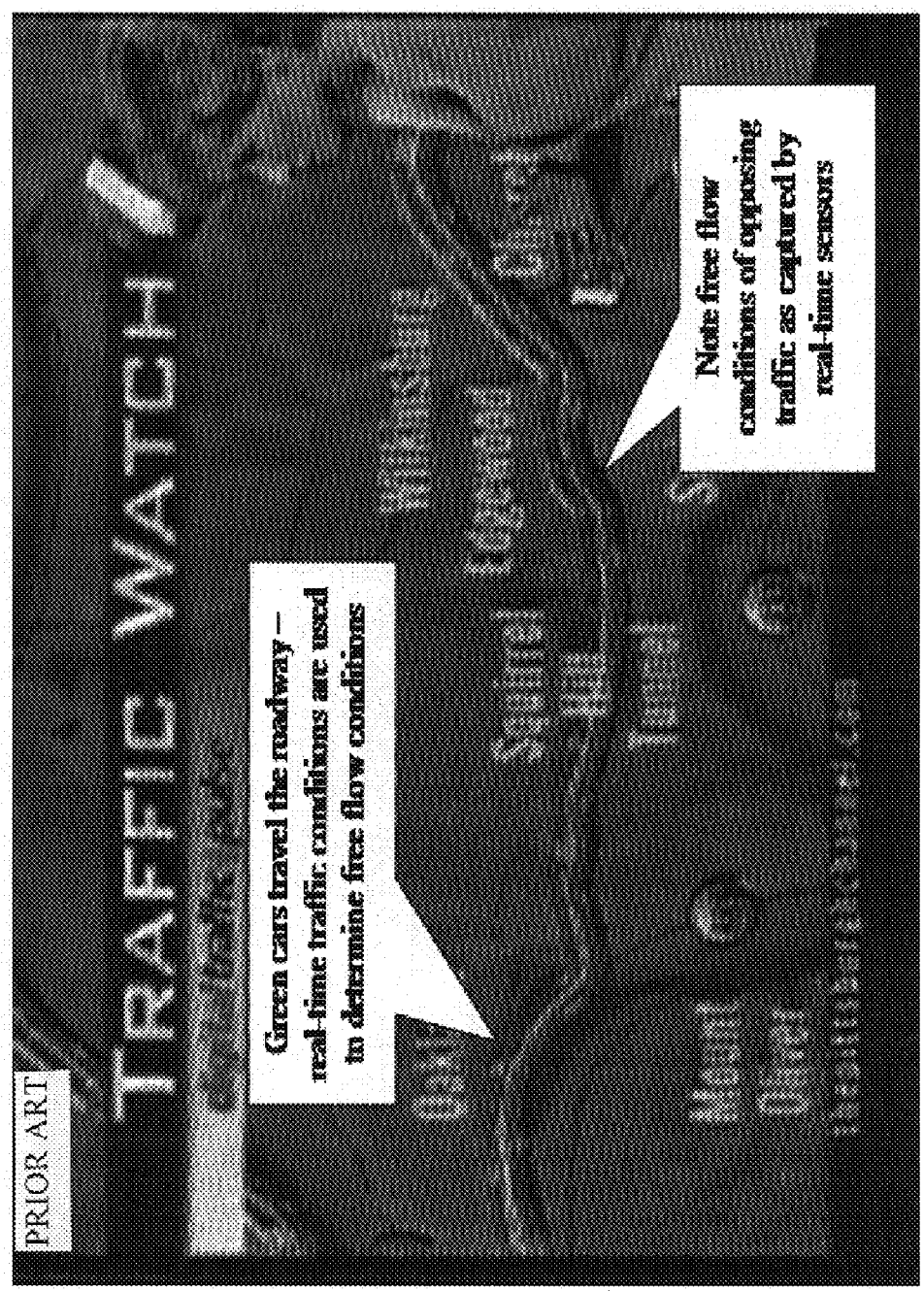
Figure 3:
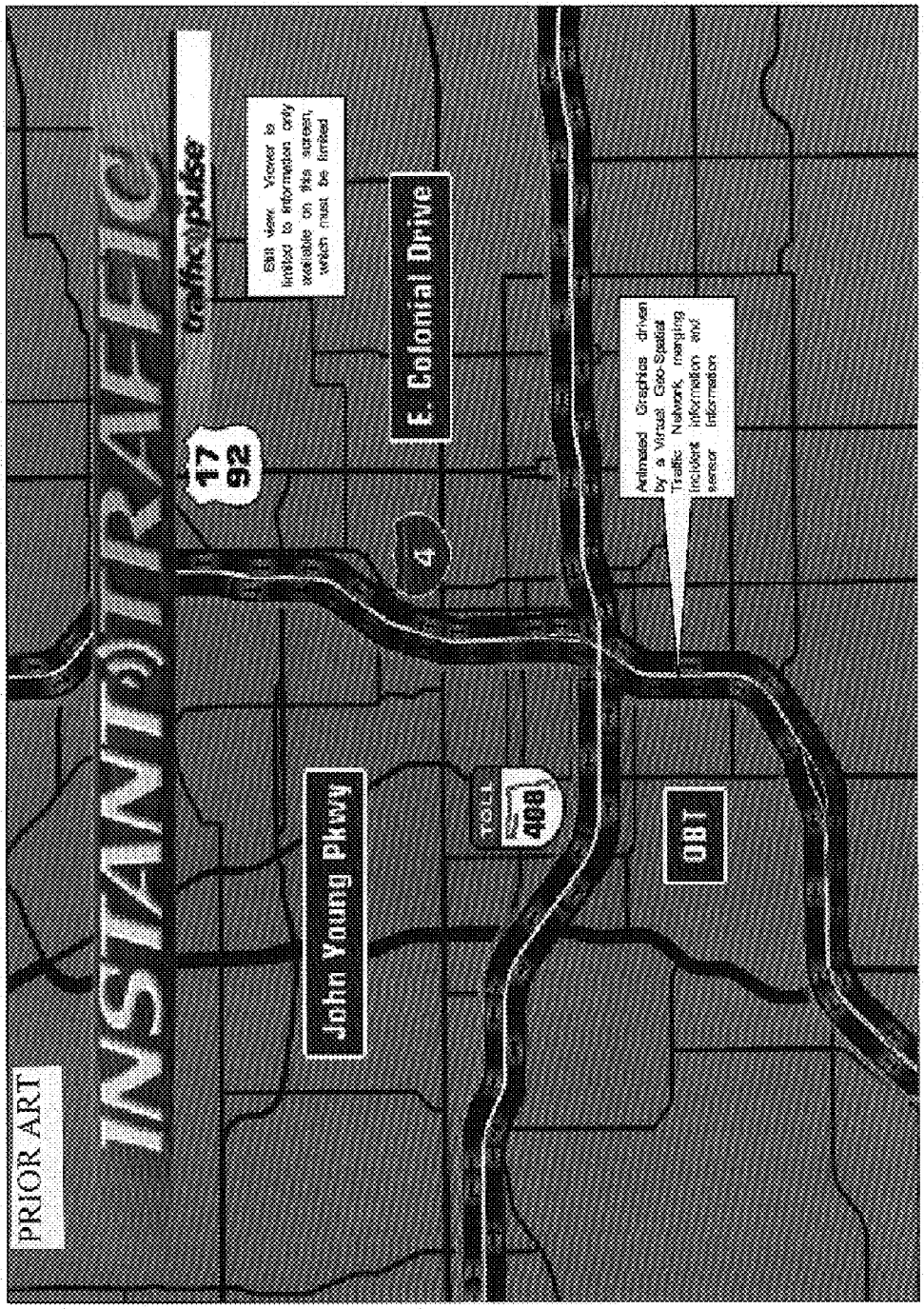
Figure 4:
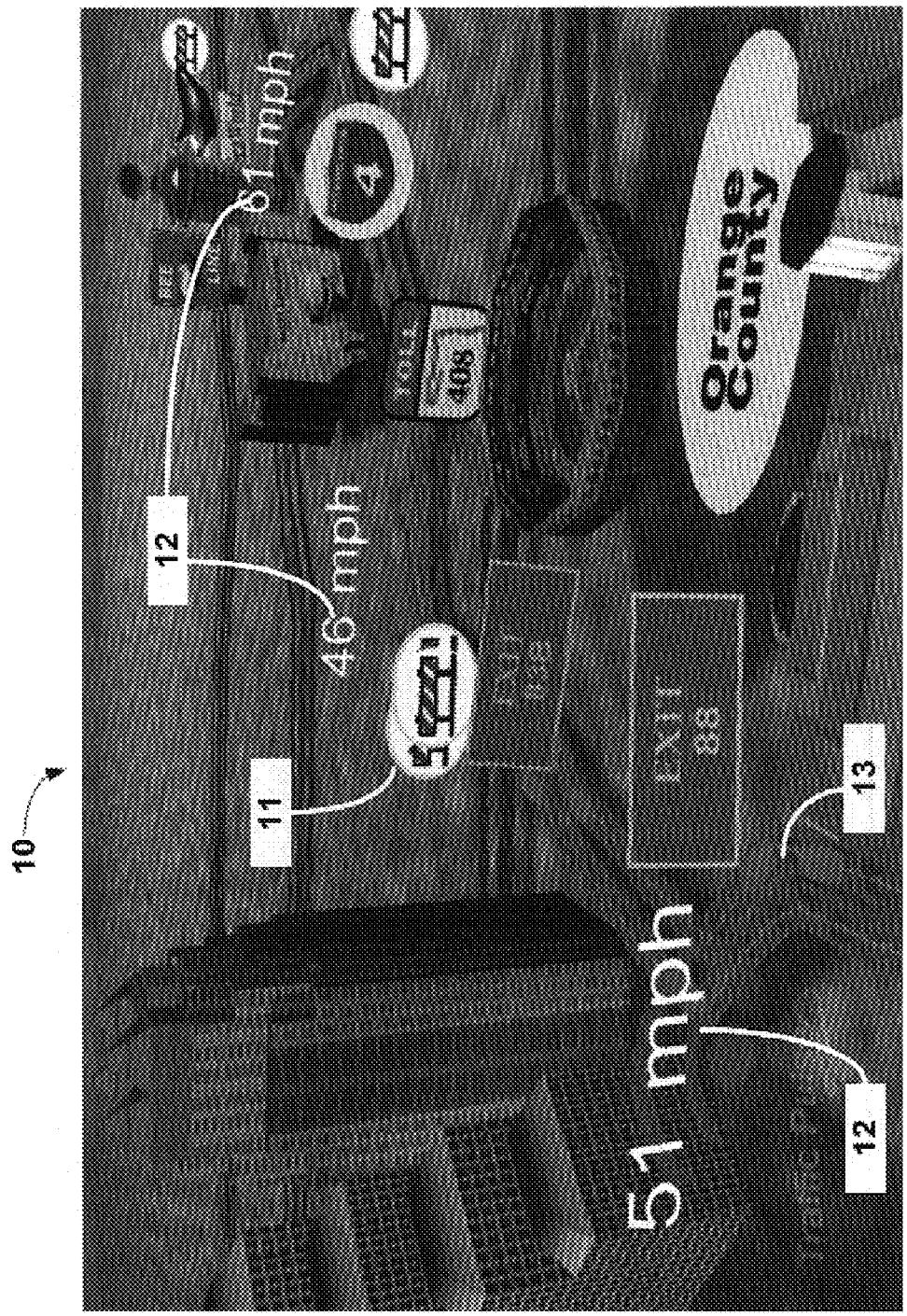
Figure 5:
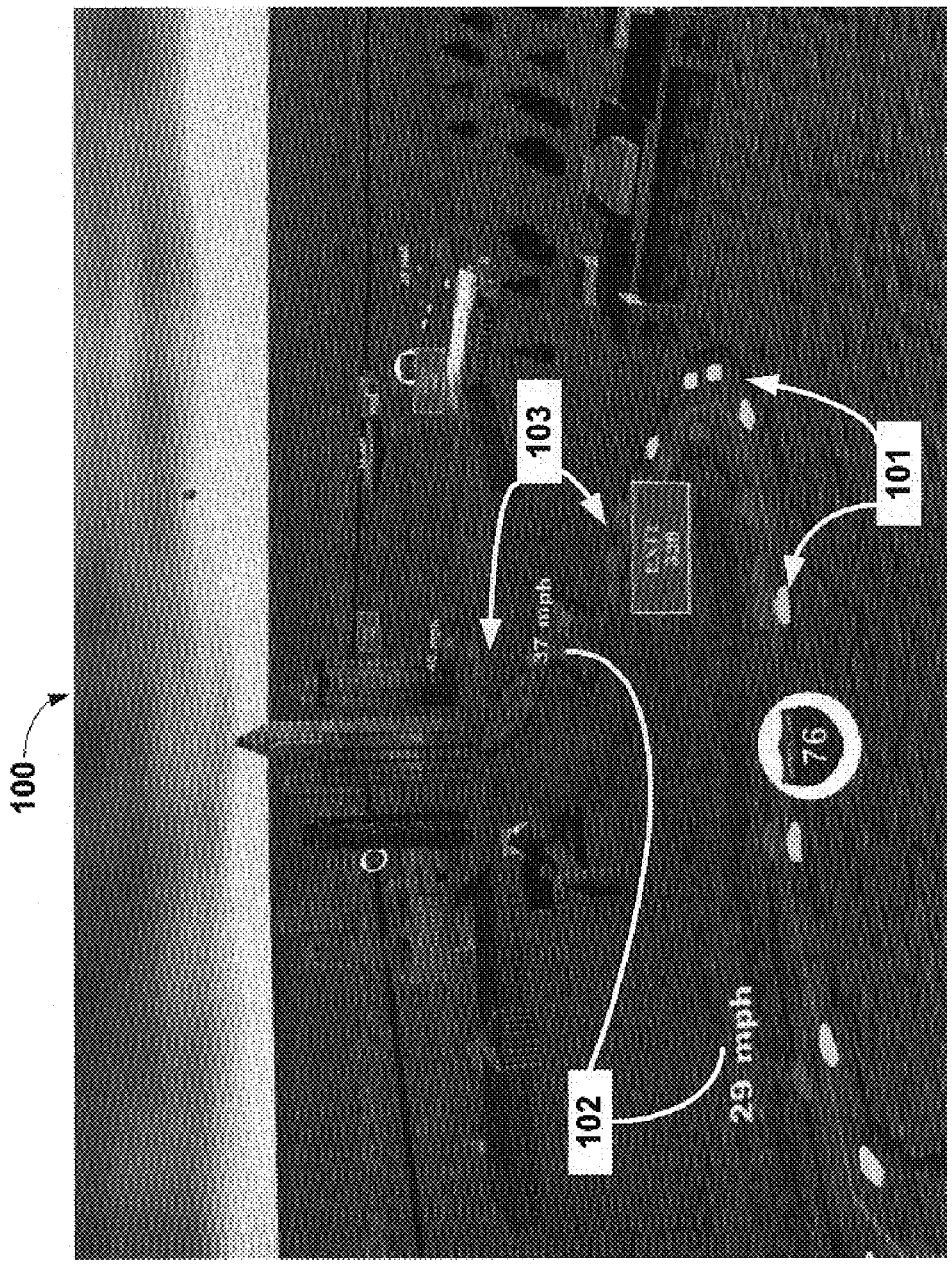

According to a preferred embodiment of the present invention, the TV3D generates a 3D traffic display, generally designated 10, as shown in FIG. 4. The display 10 represents geo-spatially related traffic conditions on a road system. The TV3D creates the display 10 by allowing the user to create 3D traffic scenes of various predefined 3D "fly-throughs" of important routes, segments or the entire road system for a metropolitan area. The traffic scenes display relevant traffic information relative to the road and landmarks along the road (also modeled in 3D) along the road. For example, in FIG. 4, the 3D display 10 displays traffic conditions, particularly congestion, by altering the color, speed, and shape of the animated cars moving along the route 13. FIG. 5 shows another embodiment of the present invention in the form of 3D display 100. The 3D displays 10, 100 may include red cars representing areas that are congested (not shown). Yellow cars show areas of moderate congestion 101. Green cars represent areas of free flowing traffic 103. The 3D display 10 also indicates the traffic incidents (e.g., car accident, construction, disabled vehicle, etc) by an icon at the relative geo-spatial location. For example, construction is indicated at point 11. Additionally, speed indicators at critical points along the routes display the current numerical average speed at the respective locations 12, 102.

Figure 6:
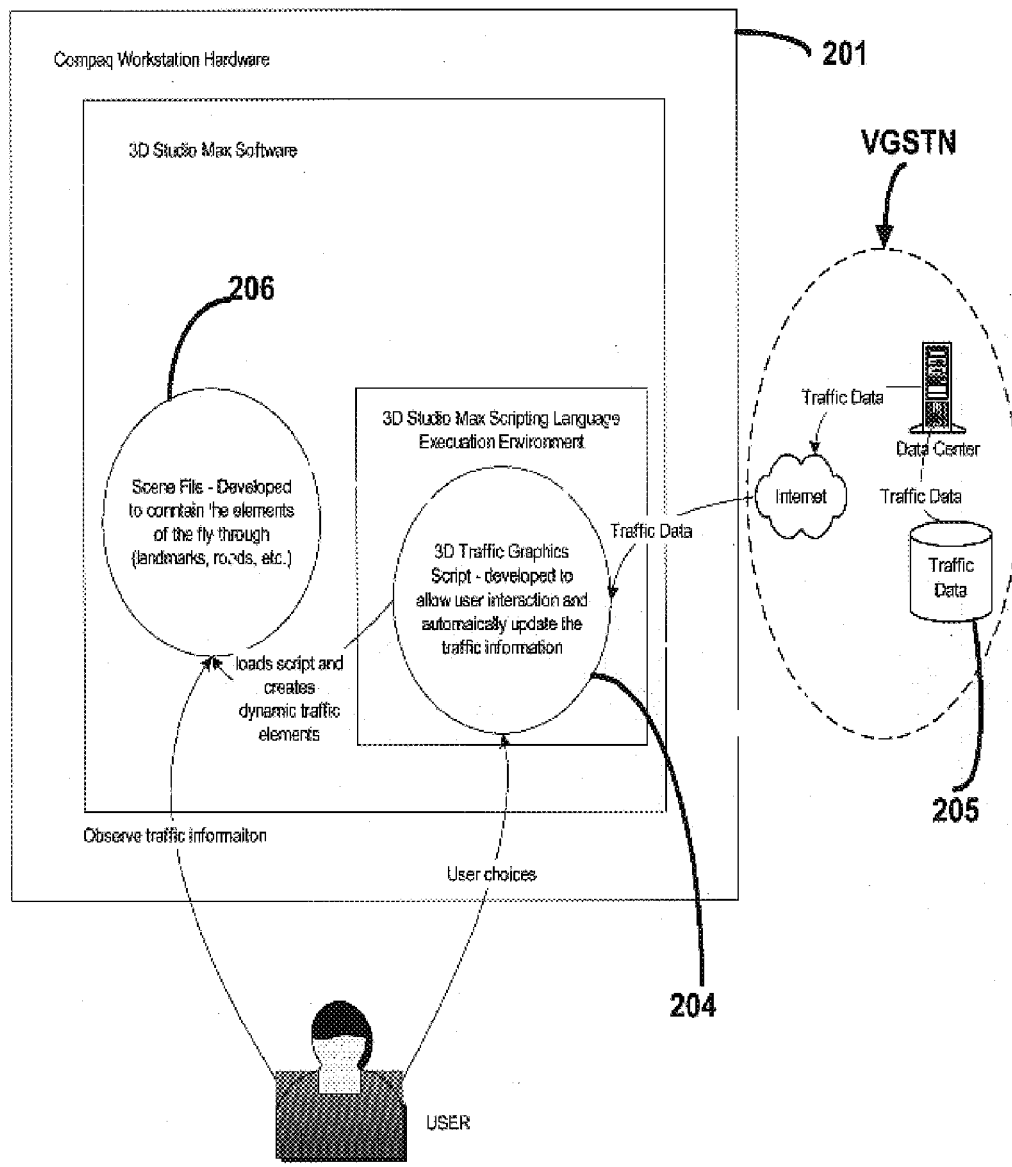
Figure 7:
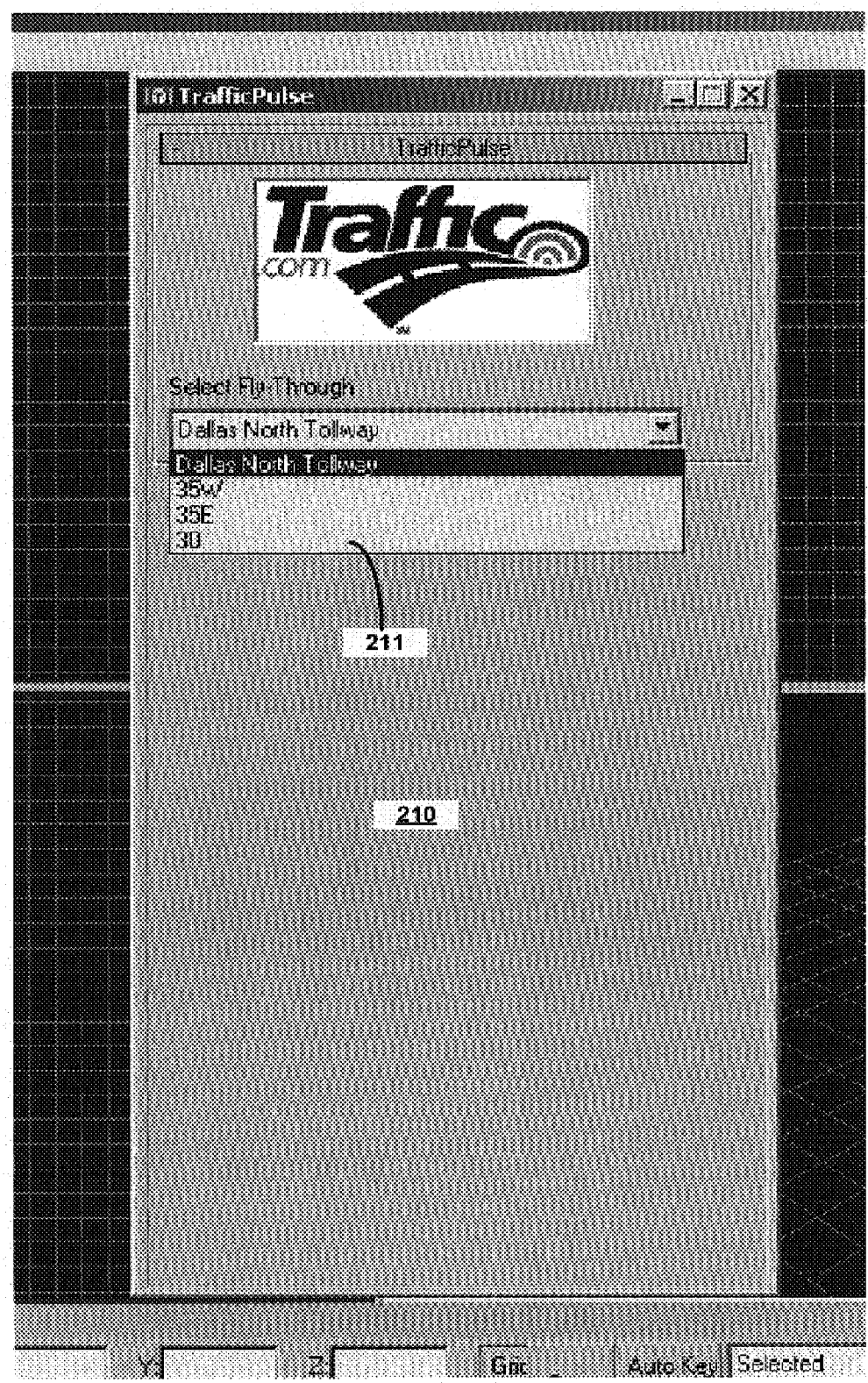

Referring to FIGS. 6 and 7, the TV3D system according to the present invention includes a graphics workstation 201 which utilizes a graphical tool set. In one preferred embodiment, the graphical tool set is 3D Studio Max software by Discreet, a division of Autodesk Inc., with 3D Studio Max Script language installed ("Max Script"). In one preferred embodiment, the workstation is a Compaq Inc. dual Xeon® processor server running using a DPS Reality video output card. Other graphic software and workstations may be used without departing from the spirit and scope of the present invention.

When the user opens the 3D Studio Max software, a Traffic Pulse 3D user interface 210 is displayed (see FIG. 7). The user interface 210 is a visual representation of the 3D Traffic Graphic script ("3DTG script") 204, which is written in the max script programming language, and is automatically started when 3D Studio Max is initially opened. The 3DTG script allows the user to select the desired fly-through scene(s), accesses the VGSTN for traffic data 205, and allows the user to control the visual elements that are ultimately displayed on the 3D display 10, 100. The user selects the desired route using the route selection menu 211 which loads the 3D Studio Max Scene file 206 corresponding to the selected road or segment. The scene file 206 contains the various 3D static models of the roads and landmarks of the desired fly-through route.

The 3D Studio Max software includes user interface controls that allow the producer to perform the following capabilities:

1. Select the fly-through, or camera route, to be used for rendering the 3D display;
2. Select incidents to display and control of their placement on the view;
3. Select and enter point speeds or other information from the VGSTN, such as travel times or delay times; and
4. Render broadcast video of the 3D display.

Fly-through Scene Design

Figure 8:
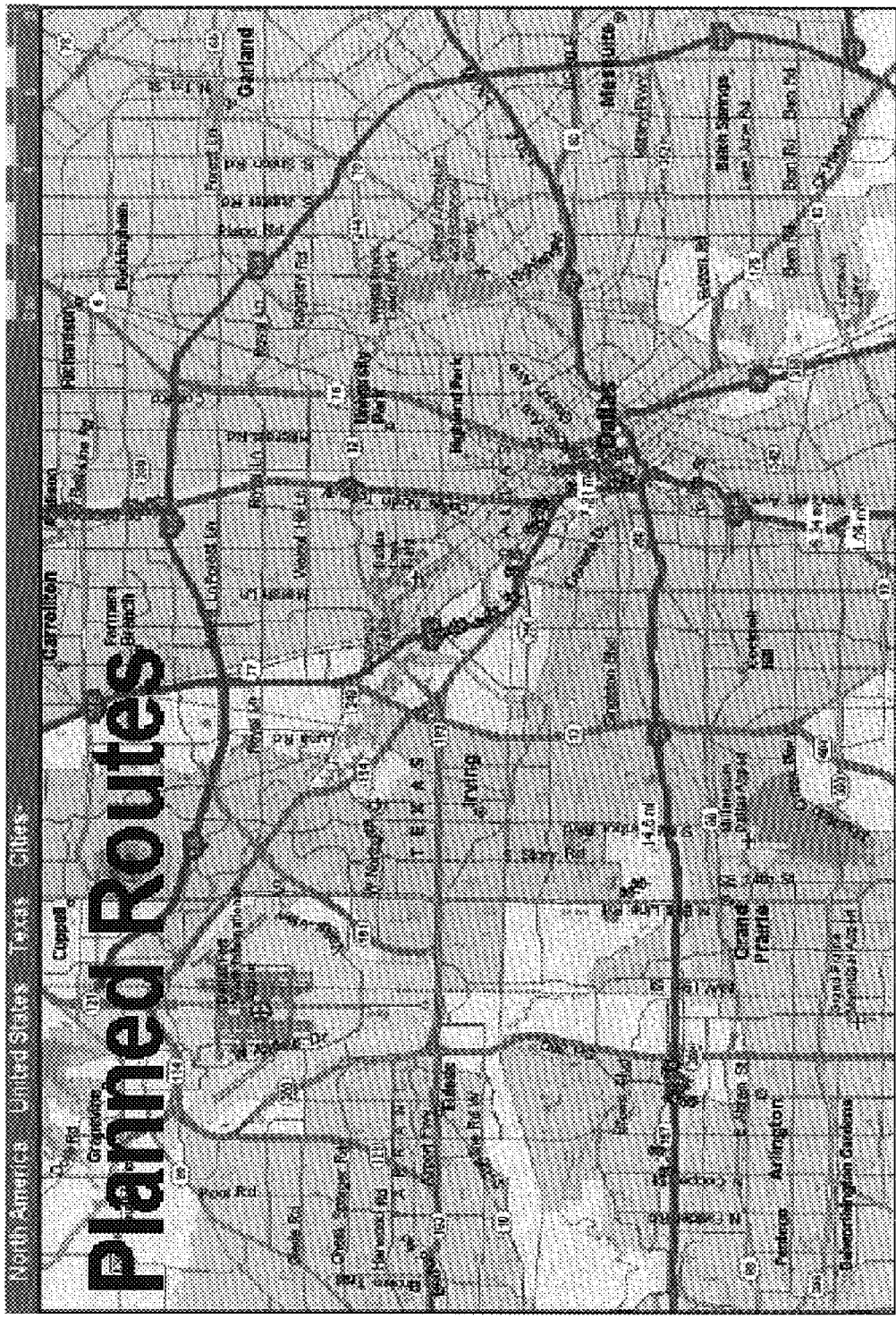

The fly-through scenes utilized with the TV3D are designed to correspond to a specific metropolitan area. Desired fly-through routes are selected based on their importance for traffic conditions (typically high usage, significant traffic issues, etc.) and for the availability of notable landmarks. The scene characteristics include the specific altitude, angle, speed and direction of the view of the fly-through. Once the route is planned and the landmarks along the route have been specified, the route and landmarks are plotted using mapping software having planned routes 220 (see FIG. 8). Each scene focuses on one route with the camera perspective moving along that route in a single direction according to the selected characteristics. Preferably, a second fly-through scene is produced moving over the same route in the opposite direction.

Figure 9:
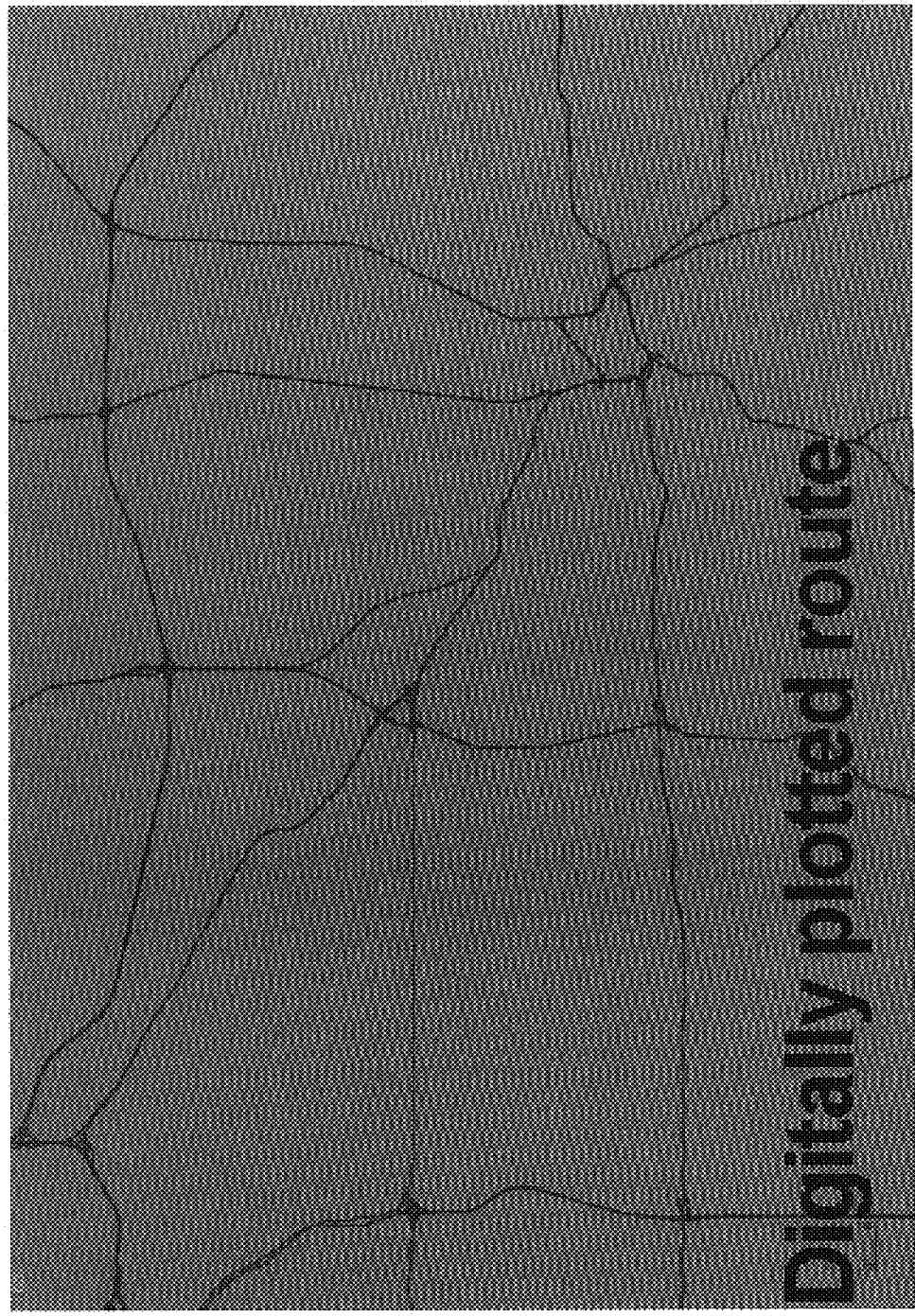

To produce a scene, the major roads of the selected metro area are imported into the Studio Max software to create a digitally plotted route system 230. For example, the digitally plotted route system 230 shown in FIG. 9 represents the actual road map shown in the mapping software of FIG. 8 having the planned routes 220. The digitally plotted route system 230 provides the fundamental reference points for all other parts of the scene. 3D road elements and landmarks, as well as the path for the cars that illustrate the traffic conditions, are based directly on the road reference points obtained from the digitally plotted route system 230.

Figure 10:
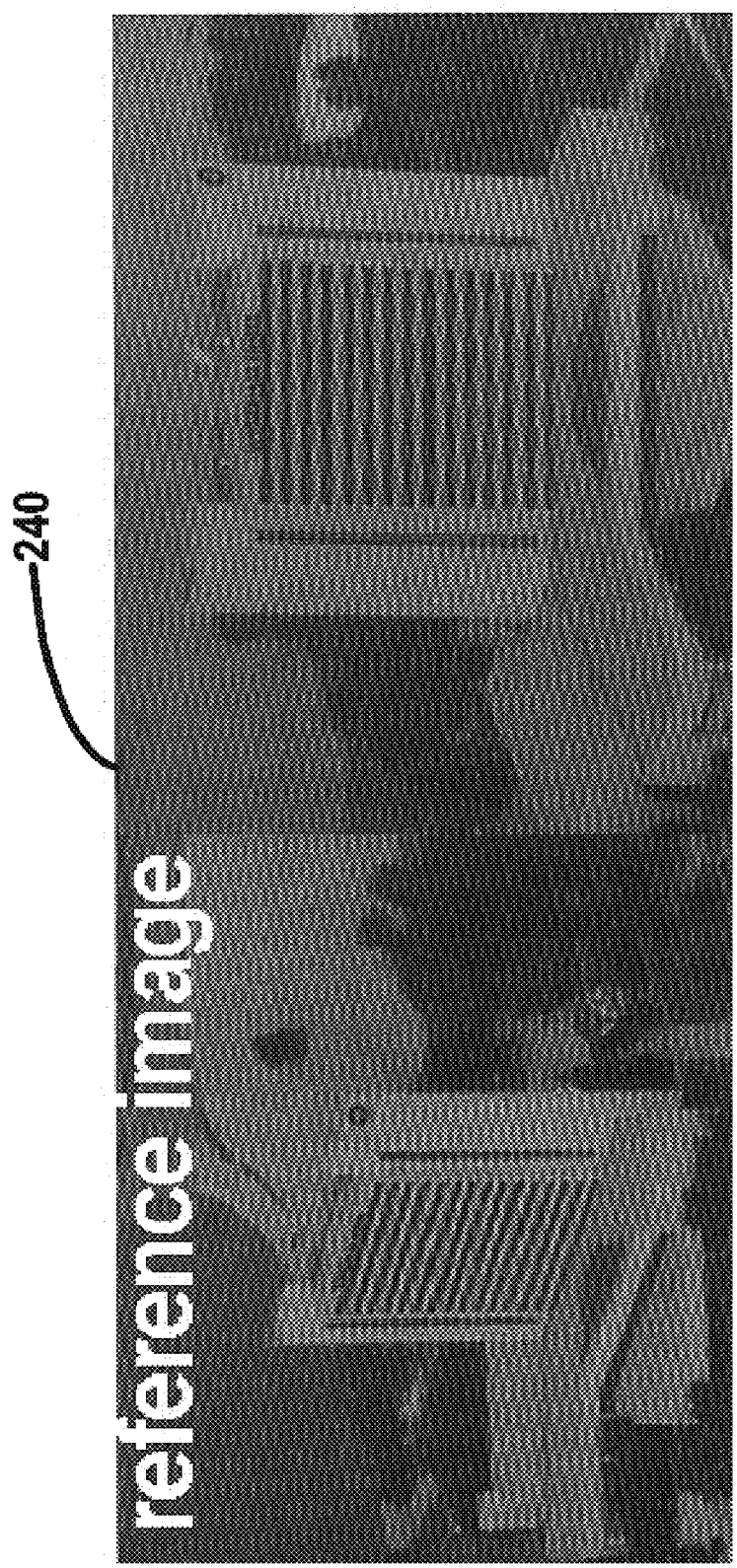

As shown in FIGS. 10-12, reference images 240 of landmarks are used to produce the 3D model of each desired landmark for the scene. A landmark may include buildings, billboards, signage or any other structure located adjacent to or on a roadway. The reference image 240 (see FIG. 10) is used to discern the structure of the landmark and to produce a model image 242 of the landmark (see FIG. 11). The model image 242 is used to produce a skin, or texture image 244 for the building that can be laid over the structure. The resulting 3D textured model 246 closely resembles the original reference images. The textured model 246 of the landmark is placed in the scene according to the location in the original route specification 248 (see FIG. 12).

Downloading Traffic Data

Referring to FIGS. 13-19, after a user chooses a desired fly-through scene, the 3DTG script preferably accesses a VGSTN for the traffic data 205. The traffic data 205 is accessed in three phases: static road configuration, road congestion, and traffic incidents. The traffic data 205 for the first phase is requested from the TVFeed component server through a GetMap request with parameters for the metro$_{13}$ id and a latitude-longitude bounding box, such as the bounding box 235 shown in FIG. 13. The GetMap call returns information about each of the predefined static road links within the bounding box 235. FIG. 14 shows a portion of the XML document which the Graphic Layer of the VGSTN returns corresponding to the desired road link information. The road link information includes the link ID 251, the latitude/longitude points for the link 252, the length of the link 253, the road name of the link 254, and the direction of the link 255.

As shown in FIG. 15, the 3DTG script program calls a DOS batch file (route.bat) 261 to download the information via an HTTP request using the "Curl" utility program 263. The data is returned from the server as an XML document and saved on the system. The XML document is then processed into a data file in a format understandable by the 3DTG script. The Xalan program performs an XSLT transformation 264 on the XML document to accomplish this. The XSLT transformation filters only the desired road/direction and saves a subset of the link information that is returned from the server (link ID 266, road/direction 267, and link length 268). The information is saved in a tab-separated format 265 to be read by the 3DTG script. Note that the information can be followed through the processing: the link ID 251 in the source document is in the document 266; the road information (road name 254 and direction 255) is in the document 267; and the link length 253 is in the document 268.

Referring to FIGS. 16-17, the dynamic congestion information (i.e., the second phase) is accessed and stored in much the same manner as the first phase. The 3DTG script calls a DOS batch file 281 that requests the state of the associated links from the TVFeed server in the VGSTN. This request is a GetStatus with parameters for the metro_id and the latitude-longitude bounding box. The congestion information is returned as either a 'yellow' or 'red' status (moderate congestion and severe congestion, respectively) 273 for each link with its link ID 271 in an XML document. The road information 272 is also included in this document. This document is then processed by Xalan using an XSLT transformation document 284 to filter out unwanted links (not on the desired road) and change the format into a tab separated document or file 285 so it may be read by the 3DTG script. The file 285 includes the link id 286, the link congestion status 287, and the road information 288 (for reference for debugging purposes only).

FIGS. 18-19 show accessing the traffic incident information from the VGSTN. The same techniques with respect to phases one and two above are used, except that a GetIncidentsForMetroArea call is made on the incident service portion of the VGSTN. The incidents are downloaded as an XML document 296 and transformed into a tab separated data file 295. The data for each incident in the final data file includes latitude and longitude 291, criticality 292, incident type 293, and a text description 294. This information is included in the final tab separated data file 295 by the XSL processing.

In the preferred embodiment, the TV3D requires access to a VGSTN's XML interfaces over a communication link such as standard TCP/HTTP Internet connection. The VGSTN's XML feed is accessed by the TV3D via various scripting languages and integrated into a 3D modeling tool, such as 3D Studio Max. For example, the 3D Studio Max application has an embedded scripting language that integrates the traffic data 205 from the VGSTN into the TV3D.

It should be noted, however, that the present invention does not require access to a VGSTN to produce a 3D display to generate fly-through scenes of traffic conditions on a road system. Accessing a VGSTN and integrating the traffic data therefrom simply increases the sophistication of the traffic flow data shown in the 3D display since the VGSTN includes synaptically integrated traffic data. However, any traffic data file (e.g., real-time, non-real-time, not-integrated traffic data) may be used to create a 3D display showing traffic flow conditions according to the present invention.

Illustrating Congested Traffic Flow

A specific 3D fly-through illustrates traffic conditions on a specific route, such that congestion along the route is shown as the camera or view travels or "flies" along the route. As discussed above, the route path was initially specified when the scene was created in the 3D Studio Max software. Cars shown on the route are preferably animated such that they "travel" along the route path, changing colors to indicate the congestion at any given point on the route. Animated cars or other objects may move at speeds indicative of their respective congestion level. Thus, the TV3D system must determine at what points along the route path the cars should change color to indicate congestion on a specified portion, or link, in the route. Cars turn a specific color (for example, red for a jammed link) at the start of a congested link and turn back to green at the end of the congested link.

Where a link begins and ends is determined by the amount of the full route path it occupies and its position in the path. For example, referring to FIG. 20, if the congested link is the first link (Link 'A') in the route path 310 and its length is 13% of the full path 310, a car starting at the beginning of the route path 310 would turn a different color immediately and would turn back to green after the car had traveled up the route path 310 13% of the way.

The 3DTG script calculates the path percentage for the beginning and end of each link by using the length of each link (available in the data file 268 in miles) and the overall link ordering (e.g., the listing order of the links in the data file corresponding to the geographic ordering of those links). As shown in FIG. 21, the link percentages are calculated as follows:
 1. Sum all of the link lengths to calculate the total route length in miles;
 2. Starting with the first link in the route path:
   a) Store its starting link percent as 0%;
   b) Divide the link length in miles by the total path length in miles to obtain the link end point path percent;
   c) Store the calculated end point path percentage; and
   d) Proceed to the next link in the path (the listing order in the data file);
 3. Analyze the next link:
   a) Store this link start point path percent as the same value as the previous link end point path percent;
   b) Divide the link length in miles by the total path length in miles to obtain the link length and add to the start point path percentage to calculate the link end point path percent; and
   c) Store the calculated end point path percentage; and
 4. Repeat step three for each link in the route path.

Accordingly, the start point path percent and the end point path percent are calculated and stored for each link in the route path 310.

The color of the cars are changed as they enter and leave each congested or partially congested link based on the previously calculated link start and stop path percentage. Changing a characteristic (like color) of an object (like the car) is accomplished by using a key frame. Since a scene for the route path is made up of individual frames, the color of an object within a specific frame number may be changed using key frames. This color can then be changed again at a later point. To make the desired color changes (entering and exiting the congested link), a key frame number for each change is calculated.

The cars within a scene are assigned to follow the route path and cover the complete path distance over the entire scene length. Therefore, a percentage of the complete route path is directly correlated to a percentage of the entire amount of scene frames for that particular scene. Continuing the previous example, the entire scene can be any length. However, a common choice is to use a ten second animated scene to illustrate the traffic conditions. Thus, at thirty frames per second, 300 individual frames make up the entire scene. Referring to FIG. 22, if a car starts at the beginning of the route path 310 and link A is congested, it is desirable to turn the car red at the beginning of route path 310 and back to green after 13% of the path (i.e., the end of link A) has been covered. Therefore, a key at the first frame of the scene prompts a change in color of the car to red. When the scene is 13% complete, the car will have traveled 13% of the route path 310. If the total scene is 300 frames, link A will terminate on the 39th frame. Accordingly, a key set on the 39th frame will turn the car back to green.

To force an abrupt change in color from red back to green using the key frame concept, an additional key frame must be set on the 38th frame to indicate that the car is red. This is due to the fact that the key frames simply specify a color value at a particular frame. If a red key were specified at the first frame and a green key were specified at the 39th frame, the car would start out red and then would slowly transform to green by the 39th frame. By setting a red color key on the 38th frame in addition to the other key frames, the car starts out red and remains completely red until the 38th frame. On the 39th frame, the car becomes green.

However, as shown in FIGS. 4 and 5, there is not just one car starting at the beginning of the route 13. There are many cars that follow the path starting at different locations along the path 13. The 3DTG script is configured with the car starting locations and copies a default car that is outside the camera view and places them on the path at the specified path percentages. These cars also cover the full path over the full duration of the scene. For cars that start somewhere in the middle of the path, they wrap around from the end of the path to the beginning of the path and cover the rest of the path to end at their starting location by the end of the scene. Since the 3DTG script knows the starting path percentage of each car, it can perform an offset calculation to determine which frame should have a color key. These cars are set to start with a green color via a green color key at frame 0, such that their colors are altered when they reach a congested link.

For example, as shown in FIG. 23, if a car were to start 30% along the path 310 and link E had jammed congestion, an offset would be calculated to determine the key frames for color changes even though the car did not start at the beginning of the path 310. The start point of link E is 50% from the beginning of the path 310 and the end point of link E is 58% from the beginning of the path 310. Based on the car start point and the link E start point, the car must be turned red after it travels over 20% of the path. Since the whole path is covered in 300 frames, this path length is equivalent to 60 frames (20% of 300 frames). Therefore, at frame 60 a color key is set for the color to be red. To force this to be an abrupt color change there is also a key set for green color at frame 59. Since the link is 8% of the total path, 24 frames later (8% of 300 frames) the color must be changed back to green to signify that the car has left the congested link. Therefore at frame 84 (60+24=84) a color key is set for the car to be green. Again, to force the abrupt change in color, a red color key must be set on frame 83.

When adding key frames to the scene, the congestion status of the previous link in the route path must be verified. If the previous link has the same congestion type as the current link, the car color should stay the same over both links. Thus, at the end of the previous link, there is no need for a key frame to turn the car back to green. Since the car remains the congestion color, there is also no need for a key frame at the beginning of the next link to turn it to the corresponding congestion color. Similarly, when the previous link is a different congestion type, there is no need to turn back to green at the end of the previous link. However, the cars are nonetheless turned a different color at the start of the next link. Thus, the same checking is completed when considering the congestion type of the next link. Additionally, when the starting path percentage of the car is in the middle of a congested link, a special key frame must be added to turn the car the color of the congestion at frame zero. Furthermore, since the cars travel the full complete path over the scene length independent of the starting location, wrapping considerations are taken into account when looking at the "previous" and "next" link.

The foregoing discussion and examples assume that it is known which links are congested. However, the 3DTG script must read the data from the link congestion information file 285 to determine which of the links are congested. The dynamic congestion data is then read from the data file that was created. Links that contain moderate or heavy congestion are listed in this file. As each link is read, the link id of the congested link is searched for in the configuration information that was previously read from the route information data file 265. When a match occurs, the congested link has been found and the processing described previously is performed to add key frames for each car on the path to indicate this congested link. This is performed for each congested link.

Additionally, those skilled in the art will recognize that the objects (i.e., cars) shown in the scene which represent different congestion levels need not be animated as discussed above. Rather, the cars may be static, having different colors within each different link without departing from the spirit and scope of the present invention.

Illustrating Traffic Incidents

The 3DTG script also places incident markers in the scene based on dynamic data in the downloaded traffic incident data file 295. The 3D Studio Max scene file 206 is structured such that the coordinates of the scene correspond to the latitude and longitude of the actual, physical area being shown. For example, scenes in North America are designed such that all of the objects in the scene exist in the quadrant with positive "y" and negative "x" coordinates corresponding to the negative longitude and the positive latitude in North America. Incident icons that are placed outside of the camera view of the scene are copied and placed at the correct location based on the latitude and longitude of the incident. The specific icon that is copied depends on the type of incident. For example, if the incident type is "construction," a construction barricade icon is copied. Other incident icons include car accident, truck accident, disabled vehicle, fire location and event. The icon border is changed based on the criticality of the incident. The criticality is supplied in the data file 295.

The 3DTG script further includes an interactive user interface 340 that cycles through each incident that has been placed in a particular scene (see FIG. 24). Upon selecting an incident, information about the incident is displayed and the user is permitted to control the incident. The user interface 340 displays basic information 342 about the incident from the information provided in the data file 295 so that the user is sufficiently familiar with the incident to provide details of the incident in the traffic report. However, in the scene or 3D display, the incident is simply marked by an icon as described above. Thus, the user of the TV3D system need not be familiar with 3D modeling. Accordingly, basic capabilities to alter the location of an incident icon within the scene (i.e., on the 3D traffic display) were included in the user interface 340. The location control 344 allows the user to nudge the incident marker slightly north, south, east, or west, and is useful if the incident is in an unfortunate location (e.g., partially blocked by a road shield, behind a building, etc.). The user interface 340 also has the ability to prevent incidents from being displayed 346. For example, if the scene includes numerous long running incidents (e.g., construction, event, etc.), the user may not want to focus on such incidents during a specific report.

Illustrating Point Traffic Speeds

In some metropolitan areas, the flow data from roadside sensors is available. The 3D Studio Max scenes are created with sensor speed display points 12, 102 in the scenes, as shown in FIGS. 4 and 5. As shown in FIG. 25, the user may elect speeds for individual sensors 352 for displaying detailed flow information in the 3D display 10, 100. The user may also disable the display of the sensor speeds 354 if the speed data is not available.

FIG. 26 shows a flow diagram summarizing the process to create and render a scene, and thus a 3D traffic display 10, 100, such as that shown in FIGS. 4 and 5. According to FIG. 26:

1. The producer selects the desired route;
2. Various scripts access the VGSTN in real-time through multiple XML calls into the VGSTN;
3. The traffic data is translated into a format easily integrated into a modeling tool such as the 3D Studio Max application;
4. The tools script code (such as 3D Studio MaxScript) code processes the traffic data (flow/congestion, incidents and events, point speeds, and other information) and displays the traffic information on the screen;
5. The producer has the option to hide incidents, move incidents and edit the point speed data as well as make other visual modifications;
6. The producer renders the view into a scene for direct output to a video device; and
7. The producer accesses a player to play the scene out to a video interface (such as NTSC, PAL, SDI or other format) supported by the device.

The present invention provides numerous advantages including:
1. Accurate depiction of traffic flow conditions in a multi-dimensional view.
2. Full integration with the VGSTN.
3. Representation of traffic conditions from real-time traffic incidents, events, speeds, volume, density and travel times.
4. Placement of static and active billboards for advertisements within the 3D views.
5. Conversion of traffic data from a VGSTN into a 3D or greater dimensional view that is spatially correct, thereby providing a more accurate and simpler presentation of the current traffic conditions as stored and represented in the VGSTN.
6. Placement of geo-spatially correct landmarks within a VGSTN to add context to the view as well as color to the presentation of the product.
7. Management of landmarks, signage, terrain, and other portions of the VGSTN within the display by utilizing their proximity (or distance) to the current view. This allows various components of the application to appear and disappear according to their position within the VGSTN relative to the current view of the system.
8. Animation of any graphical aspect of the TV3D, thus further enhancing the system's capabilities. Such animation includes vehicles representing congestion or data flow from the VGSTN, incident icons, landmarks (for example, a boat on a lake), or other colorful objects (such as a helicopter flying through the view to an airport or other landmark).
9. Utilization for broadcast media, digital media (AVI or MPEG formats, etc), telematics or other visual display methods.

Additionally, according to the present invention, the viewer has the ability to virtually "fly" through the display to tell the story of current traffic conditions. Such fly-throughs provide a method for conveying traffic information and any single fly-through may contain multiple directions and angles. Although known traffic condition display methods depict a single view of an area, thereby leading to illogical jumping around over the traffic map while all of the traffic conditions of a route are presented, the fly-through of the present invention shows the viewer the traffic conditions from the beginning to the end of a desired route. This is a significant difference in the ability for a viewer to visualize and understand what is occurring in a person's daily commute.

Additionally, the TV3D according to the present invention has the ability to utilize the integrated traffic data within an existing VGSTN and the related data it maintains, including:
1. A spatially accurate road system that can be referenced by a group of routes, where each route is defined by a group of uniquely identifiable links. Each of these links represents a logical segment of the roadway. The conditions of the roadway are logically provided to the user from the graphical layer of the VGSTN (although other layers may be used in addition to or in place of the graphical layer).
2. The meta-information of each link, in particular, its spatial makeup, is represented in terms of spatially accurate data.
3. Each link in the VGSTN represents its own state. For example "clear" (green), "slow" (yellow), or "jammed" (red). This state is determined based on a combination of flow data and/or congestion data within the VGSTN.
4. Other, non-congestion incidents or events are available from the VGSTN in terms of geo-spatial references (latitude/longitude). These references contain details regarding specific traffic incidents, such as criticality, description and type of incident.
5. Point-speed sensor data, when available, may be extracted from the VGSTN and input into the TV3D.
6. Weather information, such as ice, rain, snow, etc is available via the VGSTN for input to the TV3D.
7. Billboards or other signage for advertisements may be placed within the TV3D.
8. Movement within the TV3D can be modified to adjust visual characteristics seen on the 3D display. For example, the speed, angle, direction and altitude of a fly through, the size, speed, shape, and color of the representation of the traffic flow, the billboards, signage, incidents, events and other information may be manipulated.

Prior to installing the system at a client location, the TV3D system is preferably set up in the following manner:
1. Base map data from the VGSTN is integrated into the application, including the geo-spatial characteristics of the routes to be used;
2. Local landmarks are selected along the route to be modeled;
3. Billboards or signage are applied to the model;
4. Photographs (from various perspectives) and other data related to the local landmarks are collected; and
5. The landmarks are modeled using the 3D Studio Max tool and integrated into the 3D rendition of the traffic data from the VGSTN.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A computer-implemented method of displaying traffic conditions on a road system, the method comprising:
   (a) creating a simulated 3D graphical map of the road system, the simulated 3D graphical map including at least one segment;
   (b) determining a current status of at least one of the segments on the simulated 3D graphical map, the current status of the at least one segment corresponding to traffic data associated with that segment; and
   (c) creating a simulated 3D model of the road system by combining the simulated 3D graphical map and the current status of the at least one segment, wherein the simulated 3D model of the road system displays traffic conditions on the road system.

2. The method of claim 1 further comprising:
   (d) updating the traffic data conditions, the simulated 3D model reflecting the updated traffic data conditions.

3. The method of claim 2 wherein the simulated 3D model is updated in real-time.

4. The method of claim 1 wherein step (b) includes determining the current status of a plurality of the segments on the simulated 3D graphical map, and wherein step (c) includes combining the simulated 3D graphical map and the current status of the plurality of segments.

5. The method of claim 1 wherein the simulated 3D model includes a plurality of segments.

6. The method of claim 1 wherein the simulated 3D graphical map includes models of local landmarks.

7. The method of claim 1 wherein the simulated 3D model includes a geographically elevated ground plane.

8. The method of claim 1 wherein the simulated 3D graphical map includes animated features outside of the segments.

9. The method of claim 1 wherein the at least one segment on the simulated 3D model is animated to reflect its respective current status by simulating different vehicle speeds that are representative of actual vehicle speeds.

10. The method of claim 1 wherein the at least one segment on the simulated 3D model simulates vehicle densities that are representative of actual vehicle densities on the road system.

11. The method of claim 1 further comprising:
    (d) moving a view of the simulated 3D model along a route created by at least one of the segments.

12. The method of claim 1 wherein one or more segments of the simulated 3D model are redefined by an end user.

13. The method of claim 1 wherein the traffic data includes traffic flow data conditions obtained from roadside sensors.

14. The method of claim 1 wherein the at least one segment on the simulated 3D model is color-coded to reflect its respective current status.

15. The method of claim 1 wherein the traffic data is obtained from a virtual geo-spatial traffic network.

16. The method of claim 1 wherein the simulated 3D model is rendered in video format.

17. The method of claim 1 wherein the simulated 3D model is rendered in broadcast television format.

18. The method of claim 1 wherein the simulated 3D model is rendered in cable television format.

19. The method of claim 1 wherein the simulated 3D model is rendered in satellite broadcast format.

20. A computer-implemented method of displaying traffic conditions on a road system, the method comprising:
    (a) creating a simulated 3D graphical map of the road system, the simulated 3D graphical map including at least one segment and one or more simulated 3D point locations of the road system;
    (b) determining a current status of at least one of the segments on the simulated 3D graphical map, the current status of the at least one segment corresponding to traffic flow data associated with that segment;
    (c) determining traffic data conditions associated with at least one of the simulated 3D point locations on the graphical map; and
    (d) creating a simulated 3D model of the road system by combining the simulated 3D graphical map, the current status of the at least one segment and the traffic data conditions associated with the at least one simulated 3D point location, wherein the simulated 3D model of the road system displays traffic conditions on the road system.

21. The method of claim 20 wherein the simulated 3D graphical map includes models of local landmarks.

22. The method of claim 20 wherein the simulated 3D model includes a geographically elevated ground plane.

23. The method of claim 20 wherein the simulated 3D graphical map includes animated features outside of the segments.

24. The method of claim 20 wherein the at least one segment on the simulated 3D model is animated to reflect its respective current status by simulating different vehicle speeds that are representative of actual vehicle speeds.

25. The method of claim 20 wherein the at least one segment on the simulated 3D model simulates vehicle densities that are representative of actual vehicle densities on the road system.

26. The method of claim 20 further comprising:
    (e) moving a view of the simulated 3D model along a route created by at least one of the segments.

27. The method of claim 20 wherein at least one of the segments of the simulated 3D model are redefined by an end user.

28. The method of claim 20 wherein the traffic data conditions includes traffic flow data obtained from roadside sensors.

29. The method of claim 20 wherein the at least one segment on the simulated 3D model is color-coded to reflect its respective current status.

30. A computer-implemented method of displaying traffic conditions on a road system comprising:
    (a) creating a graphical simulated 3D map of the road system, the graphical simulated 3D map including one or more simulated 3D point locations of the road system;
    (b) determining traffic data conditions associated with at least one of the simulated 3D point locations on the graphical map; and
    (c) creating a simulated 3D model of the road system by combining the graphical simulated 3D map and the traffic data conditions associated with the at least one simulated 3D point location, wherein the simulated 3D model of the road system displays traffic conditions on the road system.

31. The method of claim 30 wherein step (b) includes determining traffic data conditions associated with a plurality of the simulated 3D point locations and step (c) includes combining the simulated 3D graphical map and the traffic data conditions associated with the plurality of simulated 3D point locations.

32. The method of claim 30 wherein the traffic data conditions associated with the at least one point location is traffic flow data.

33. The method of claim 30 wherein the traffic data conditions associated with the at least one point location is speed.

34. The method of claim 30 wherein the traffic data conditions associated with the at least one point location is incident information.

35. The method of claim 30 wherein the at least one simulated 3D point location in the simulated 3D model is color-coded to reflect its criticality.

36. The method of claim 30 wherein the traffic data is obtained from a virtual geo-spatial traffic network.

37. The method of claim 20 wherein the traffic data conditions is obtained from a virtual geo-spatial traffic network.

38. The method of claim 20 wherein the simulated 3D model is rendered in video format.

39. The method of claim 20 wherein the simulated 3D model is rendered in broadcast television format.

40. The method of claim 20 wherein the simulated 3D model is rendered in cable television format.

41. The method of claim 20 wherein the simulated 3D model is rendered in satellite broadcast format.

42. The method of claim 20 wherein the traffic data conditions associated with the at least one point location is traffic flow data.

43. The method of claim 20 wherein the traffic data conditions associated with the at least one point location is speed.

44. The method of claim 20 wherein the traffic data conditions associated with the at least one point location is incident information.

45. The method of claim 20 wherein the at least one simulated 3D point location in the simulated 3D model is color-coded to reflect its criticality.

46. The method of claim 20 further comprising:
(e) updating the traffic data, the simulated 3D model reflecting the updated traffic data conditions.

47. The method of claim 46 wherein the simulated 3D model is updated in real-time.

48. The method of claim 20 wherein step (b) includes determining the current status of a plurality of the segments on the simulated 3D graphical map, and wherein step (d) includes combining the simulated 3D graphical map and the current status of the plurality of segments.

49. The method of claim 20 wherein the simulated 3D model includes a plurality of segments.

50. The method of claim 20 wherein step (c) includes determining traffic data conditions associated with a plurality of the simulated 3D point locations and step (d) includes combining the simulated 3D graphical map and the traffic data conditions associated with the plurality of simulated 3D point locations.

* * * * *

UNITED STATES PATENT AND TRADEMARK OFFICE
CERTIFICATE OF CORRECTION

PATENT NO. : 7,634,352 B2
APPLICATION NO. : 10/932735
DATED : December 15, 2009
INVENTOR(S) : Soulchin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1108 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,352 B2 | Page 1 of 1 |
| APPLICATION NO. | : 10/932735 | |
| DATED | : December 15, 2009 | |
| INVENTOR(S) | : Soulchin et al. | |

It is certified that error appears in the above-identified patent and that said Letters Patent is hereby corrected as shown below:

On the title page, item (73), please delete "Assignee: Navteq North America, LLC" and replace with --Assignee: Traffic.com, Inc.--

Signed and Sealed this
Nineteenth Day of July, 2011

David J. Kappos
*Director of the United States Patent and Trademark Office*